(12) United States Patent
Abu-Ageel

(10) Patent No.: US 7,301,701 B2
(45) Date of Patent: Nov. 27, 2007

(54) COMPACT POLARIZATION CONVERSION SYSTEM FOR OPTICAL DISPLAYS

(76) Inventor: Nayef M. Abu-Ageel, 45K Rolling Green Dr., Fall River, MA (US) 02720

( * ) Notice: Subject to any disclaimer, the term of this patent is extended or adjusted under 35 U.S.C. 154(b) by 85 days.

(21) Appl. No.: 11/066,605

(22) Filed: Feb. 25, 2005

(65) Prior Publication Data

US 2005/0226585 A1    Oct. 13, 2005

Related U.S. Application Data

(63) Continuation-in-part of application No. 10/458,390, filed on Jun. 10, 2003.

(60) Provisional application No. 60/548,814, filed on Feb. 27, 2004, provisional application No. 60/548,293, filed on Feb. 27, 2004, provisional application No. 60/548,619, filed on Feb. 27, 2004.

(51) Int. Cl.
    *G02B 5/30* (2006.01)
(52) U.S. Cl. .................... 359/495; 349/62; 353/38; 353/20
(58) Field of Classification Search .......... None
    See application file for complete search history.

(56) References Cited

U.S. PATENT DOCUMENTS

| 5,124,841 A * | 6/1992 | Oishi | 359/487 |
| 6,497,488 B1 * | 12/2002 | Yamauchi et al. | 353/38 |
| 6,910,772 B2 * | 6/2005 | Yano | 353/20 |

* cited by examiner

*Primary Examiner*—Stephone B. Allen
*Assistant Examiner*—Derek S. Chapel
(74) *Attorney, Agent, or Firm*—Gavrilovich, Dodd & Lindsey LLP

(57) ABSTRACT

A compact polarization conversion system (PCS) for use in optical display systems is capable of emitting substantially polarized output light in response to unpolarized input light. The PCS includes a polarizer and one or more substantially planar optical element arrays in optical communication with the polarizer. The polarizer converts the input light having plural polarization states into output light having a substantially single polarization state. Each optical element array comprises a plurality of optical elements formed and positioned in a specific two-dimensional arrangement for altering at least one optical characteristic of the input light to produce desired characteristics in the output light. The optical elements can include any suitable combination of micro-waveguides, micro-tunnels, micro-lenses, micro-prisms.

19 Claims, 45 Drawing Sheets

_US 7,301,701 B2_

COMPACT POLARIZATION CONVERSION SYSTEM FOR OPTICAL DISPLAYS

RELATED APPLICATIONS

This application is a continuation-in-part of U.S. patent application Ser. No. 10/458,390 filed on Jun. 10, 2003, titled "Light Guide Array, Fabrication Methods, and Optical System Employing Same". This application also claims the benefit of U.S. Provisional Application Nos. 60/548,814, 60/548,293 and 60/548,619, all filed on Feb. 27, 2004. It is also related to U.S. patent application Ser. No. 11/066,616, titled "Compact Projection System Including A Light Guide Array", filed on Feb. 25, 2005 and U.S. patent application Ser. No. 11/067,591, titled "Light Recycler And Color Display System Including Same", filed on Feb. 25, 2005. The subject matter of the aforementioned applications is hereby incorporated by reference as though set forth in full.

TECHNICAL FIELD

The present invention relates generally to optics, and in particular, to a polarization conversion system that converts input light with mixed polarization states to output light with a substantially single polarization state.

BACKGROUND

Many direct view and projection display systems are based on liquid crystal display (LCD) technology that require light of a single polarization state. Since most light sources produce light with mixed polarization states, such display systems typically use half of the provided light and discard the other half. In order to enhance the brightness of a display system, many polarization conversion systems have been developed to convert the polarization state of the discarded light to a polarization state usable by the display system.

Known polarization conversion systems typically split a light beam into two sub-beams according to their polarization states, change the polarization state of one sub-beam to a usable polarization state using a wave plate, and then recombine both sub-beams, sending them through the display system.

The more advanced systems use an array of polarization beam splitters (PBSs) coupled either with a fly's eye lens system or an integrating rod. Recent polarization conversion systems use either a limited number of PBSs or a single reflective polarizer coupled to an integrating rod, thus, providing more compactness and lower cost than the ones that use an array of PBSs. Examples of such polarization conversion systems are shown in FIGS. 1A-1E.

FIG. 1A shows a perspective view of a prior art polarization conversion system 25 consisting of an apertured reflective plate 21, a light rod or tunnel 22, a quarter wave plate 23 and a reflective polarizer 24. Input light 19 is focused into the aperture 20 of the reflective plate 21 and travels toward the reflective polarizer 24, which reflects light with one polarization state (e.g., s state) and passes light with an orthogonal polarization state (e.g., p state). The reflected light (e.g., s state) passes through the quarter wave plate 23 and continues toward the apertured reflective plate 21. Some of this light passes through aperture 20 toward the light source and the rest is reflected toward the reflective polarizer 24 by the reflective plate 21. Since the polarization state of this light is converted into the orthogonal state (e.g., p state) after passing through the quarter wave plate 23 for the second time, this light passes through the reflective polarizer 24 when it reaches it the second time. This effectively converts unpolarized input light into polarized output light without discarding a large portion of the input light energy, and thus, improves the intensity of the polarized output light.

FIGS. 1B and 1C show two prior art polarization conversion systems 35 and 45 similar to that of FIG. 1A, except for the replacement of the reflective polarizer 24 by two polarization beam splitters 30 and 31 (FIG. 1B) and a mirror 40 with a single polarization beam splitter 41 (FIG. 1C). Polarization conversion systems of FIGS. 1A-1C have been described in Published European Patent Application No. 1,315,022 A1, to Drazic, Hall and O'Donnell, which is hereby incorporated by reference.

FIGS. 1D-1F use polarization beam splitters (PBSs) and mirrors as a replacement for the apertured reflective plate 21 of FIGS. 1A-1C, thus, providing a higher efficiency.

FIG. 1D shows a perspective view of a prior art polarization conversion system 65, which consists of two polarization beam splitters 60a and 60b, a rhomb 62, a half wave plate 63 and a light pipe 64. Input light 61 is focused into the first PBS cube 60a as shown in FIG. 1D. Light with one polarization state (e.g., p state) is transmitted to the light pipe 64 and light with orthogonal polarization state (e.g., s state) is reflected toward the second PBS cube 60b. At the surface of the second PBS cube 60b, light with an orthogonal polarization state (e.g., s state) is reflected toward the half wave plate 63 where its polarization state is converted into the orthogonal state (e.g., p state) and enters the light pipe 64. Such a system 65 has been commercialized by OCLI, Inc., A JDS Uniphase Company of Santa Rosa, Calif.

FIG. 1E shows a perspective view of a prior art polarization conversion system 80, which consists of a polarization beam splitter cube 73, a prism reflector 71, a half wave plate 74, a spacer 75 and a light pipe 76. Input light 72 is coupled into the PBS cube 73 either directly as shown in FIG. 1E or through other arrangements such as a tapered light pipe. Light with one polarization state (e.g., p state) is transmitted to the light pipe 76 through the spacer 75 and light with the orthogonal polarization state (e.g., s state) is reflected toward a prism reflector 71. At the surface of the prism reflector 71, light with the orthogonal polarization state (e.g., s state) is reflected toward the half wave plate 74, where its polarization state is converted into the other state (e.g., p state) and enters the light pipe 76.

FIG. 1F shows a perspective view of a prior art polarization conversion system 100, which consists of a polarization beam splitter cube 93, a prism reflector 91, a quarter wave plate with a reflector 92 and a light pipe 94. Input light 95 is coupled into the PBS cube 93 as shown in FIG. 1F or delivered via a tapered light pipe (not shown). Light with one polarization state (e.g., p state) is transmitted to the prism reflector 91, which in turn reflects it toward the light pipe 94. Light with the orthogonal polarization state (e.g., s state) is reflected toward the quarter wave plate 92 where it enters and exits the quarter wave plate 92 toward the light pipe 94 with the opposite polarization state (e.g., p state). The systems 80,100 are further described in U.S. Pat. No. 6,587,269 B2, to Kenneth K. Li, which is hereby incorporated by reference.

It is important that polarization conversion systems operate with minimal light loss, are physically compact, and relatively inexpensive. Although known polarization converters are useful in some applications, there is a need for improved polarization conversion systems that are more compact, light weight, efficient and cost-effective.

SUMMARY

The present invention provides a compact, light weight, efficient and cost-effective polarization conversion system (PCS) for use in optical displays.

According to one advantageous aspect of the present invention, various embodiments of the polarization conversion system provide a pre-selected spatial distribution of output light in terms of intensity and cone angle. This allows the PCS to be readily adapted to efficiently couple light from sources having wide variety of sizes and shapes into light valves (e.g., LCDs) of various shapes and sizes.

In accordance with an exemplary embodiment of the present invention, a PCS is capable of emitting substantially polarized output light in response to unpolarized input light. The PCS includes a polarizer and one or more substantially planar optical element arrays in optical communication with the polarizer. The polarizer converts the input light having plural polarization states into output light having a substantially single polarization state. Each optical element array comprises a plurality of optical elements (e.g., micro-elements) formed and positioned in a specific two-dimensional arrangement for altering at least one optical characteristic of the input light to produce desired characteristics in the output light. The optical elements can include any suitable combination of micro-guides, micro-tunnels, micro-lenses, micro-prisms.

The phrase "optical communication" means that the optical components of the PCS are arranged so that at least some of the input light received by the PCS passes through both the polarizer and the optical element arrays at some point before being emitted as output light. The phrase does not specifically limit the relative order in which the polarizer and optical element arrays receive incident light. For example, in some embodiments, the polarizer receives the input light first, and then passes it to the optical element arrays. In other embodiments, the order is reversed and the optical element arrays receive the input light first and then pass it to the polarizer.

Other embodiments, features, aspects, advantages, systems and methods of the invention will be or will become apparent to one with skill in the art upon examination of the following drawings and detailed description. It is intended that all such additional embodiments, features and advantages be included within this description, be within the scope of the invention, and be protected by the accompanying claims.

BRIEF DESCRIPTION OF THE DRAWINGS

It is to be understood that the drawings are solely for purposes of illustration and not as a definition of the limits of the invention. Furthermore, it is to be understood that the drawings are not necessarily drawn to scale and that, unless otherwise stated, they are merely intended to conceptually illustrate the systems, structures and methods described herein. In the figures, like reference numerals designate corresponding parts throughout the different views.

DETAILED DESCRIPTION

A feature of the present system is the use of optical element arrays, solid light pipes or tunnels, wave plates, polarization beam splitters and reflective polarizers to form polarization conversion systems (PCSs).

A first type of polarization conversion system (depicted in FIGS. 2A-D) uses circulation, extraction and collimating arrays, polarization beam splitters and a wave plate. This polarization conversion system provides high efficiency and compactness when compared to other polarization conversion system of this disclosure.

A second type of polarization conversion system (depicted in FIGS. 3A-C) uses a reflective plate with a distributed aperture for light recycling, a wave plate as well as circulation, extraction and collimating arrays coupled with a reflective polarizer or polarization beam splitters.

A third type of polarization conversion system (depicted in FIGS. 4A-D) uses a reflective plate with a single aperture that has an optical element array fabricated on its surface, a wave plate, light pipe or tunnel, collimating array coupled with a reflective polarizer or polarization beam splitters.

A fourth type of polarization conversion system (depicted in FIGS. 5A-C) uses a single optical element array, a wave plate in addition to a reflective polarizer or polarization beam splitters, thus, providing the most compact polarization conversion system of this disclosure.

As used throughout the figures, the z-axis designates the primary optical axis of the PCSs.

Figure 1A:
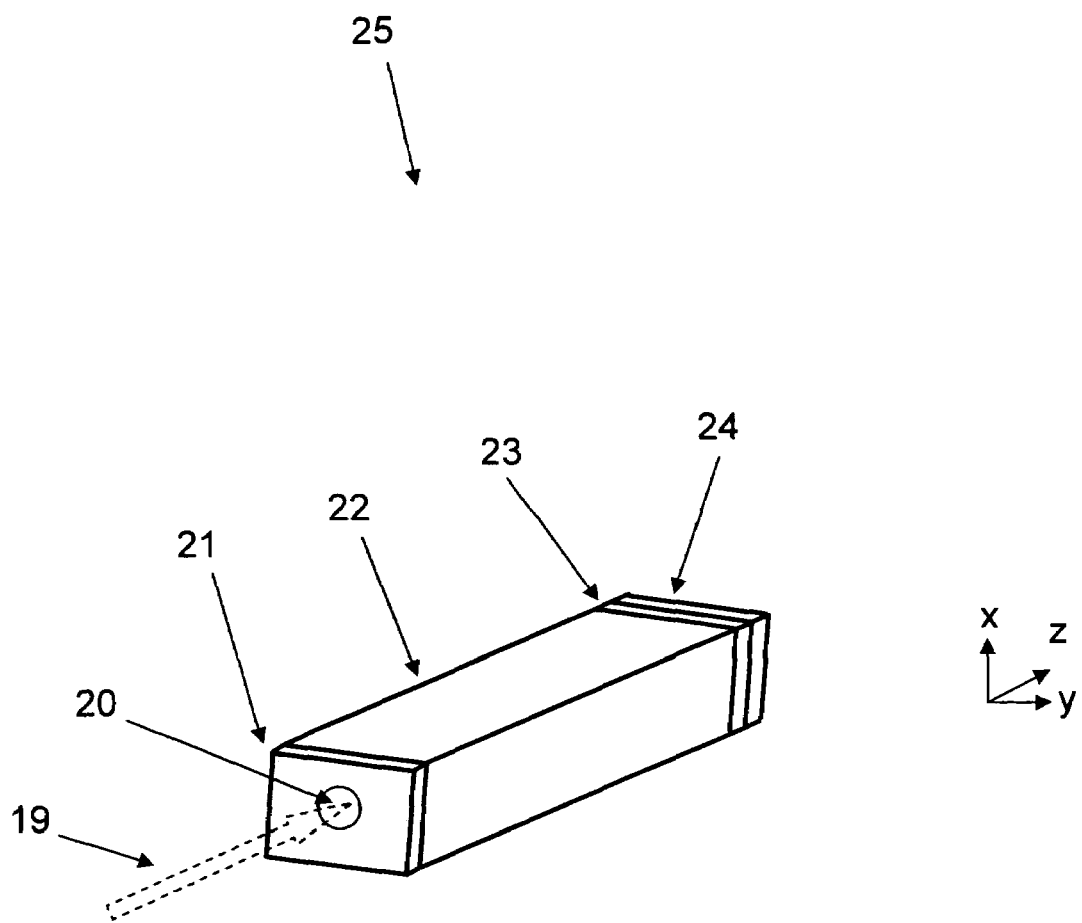
FIGS. 1A-1F show perspective views of prior art polarization conversion systems.
Figure 1B:
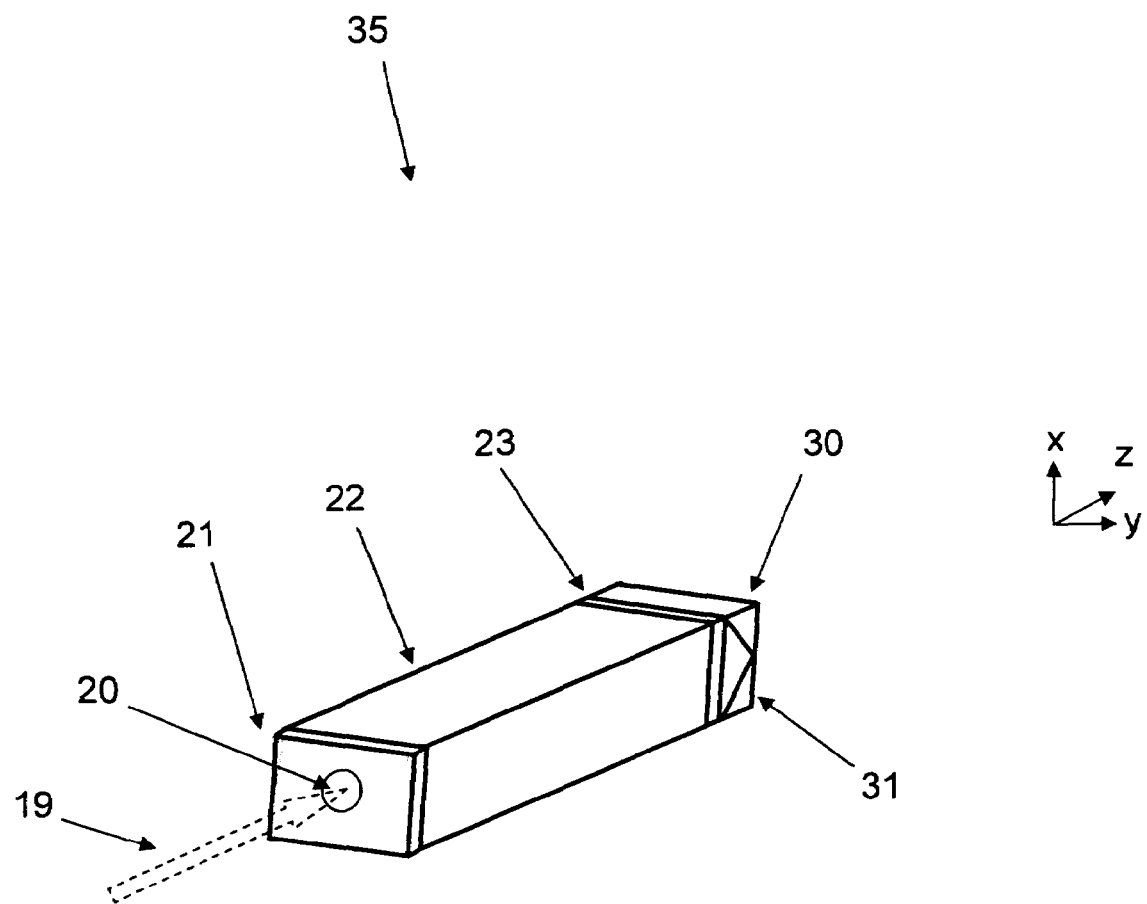
Figure 1C:
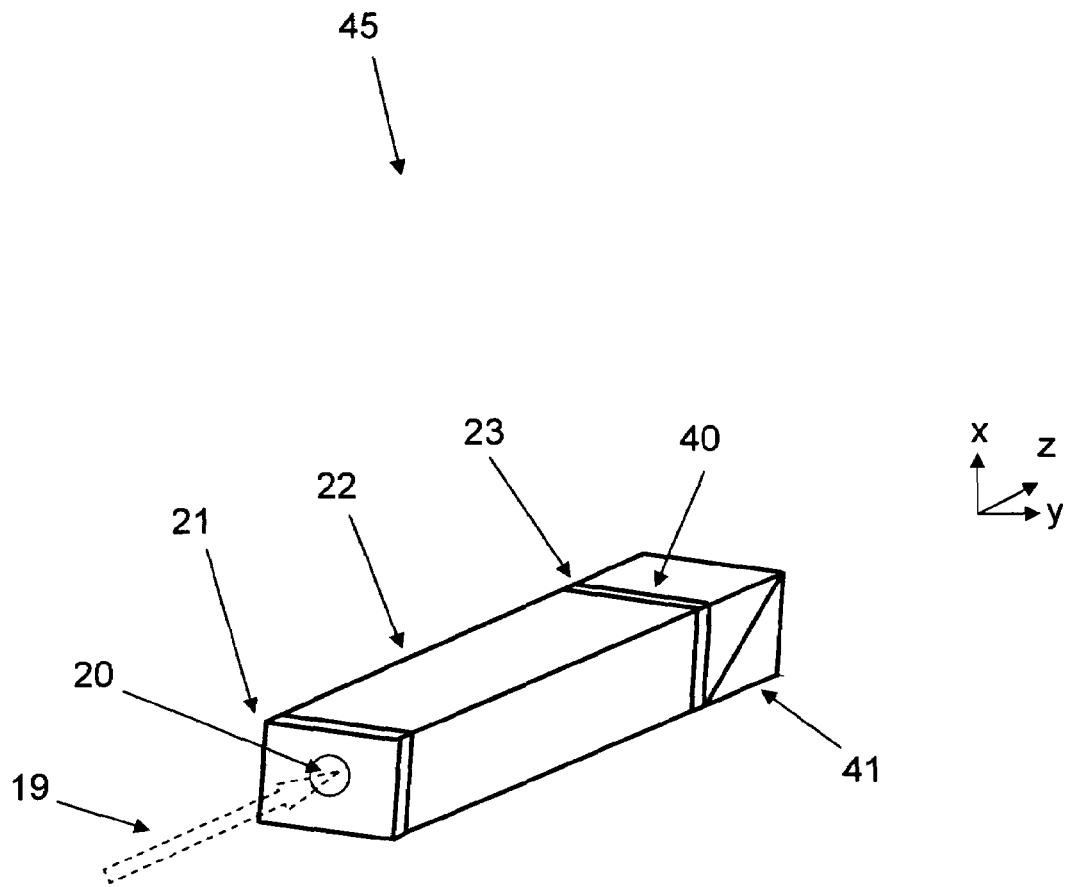
Figure 1D:
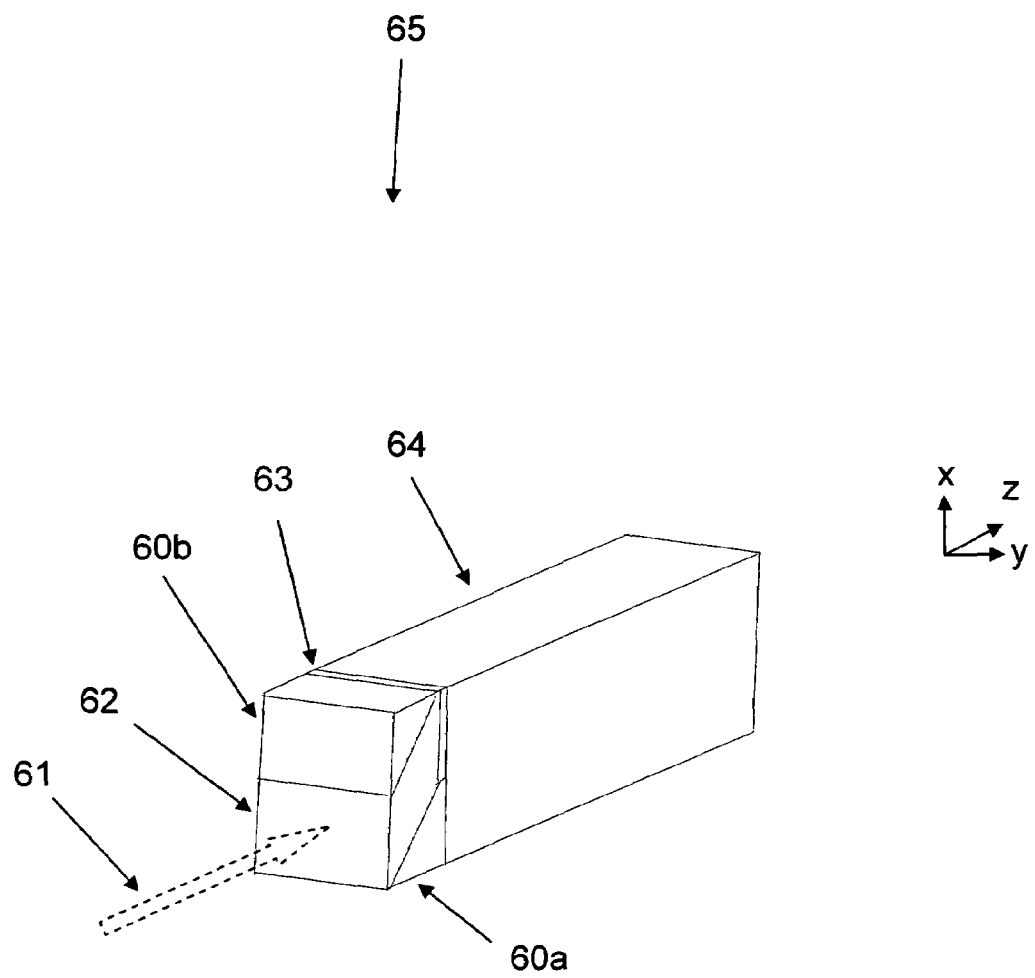
Figure 1E:
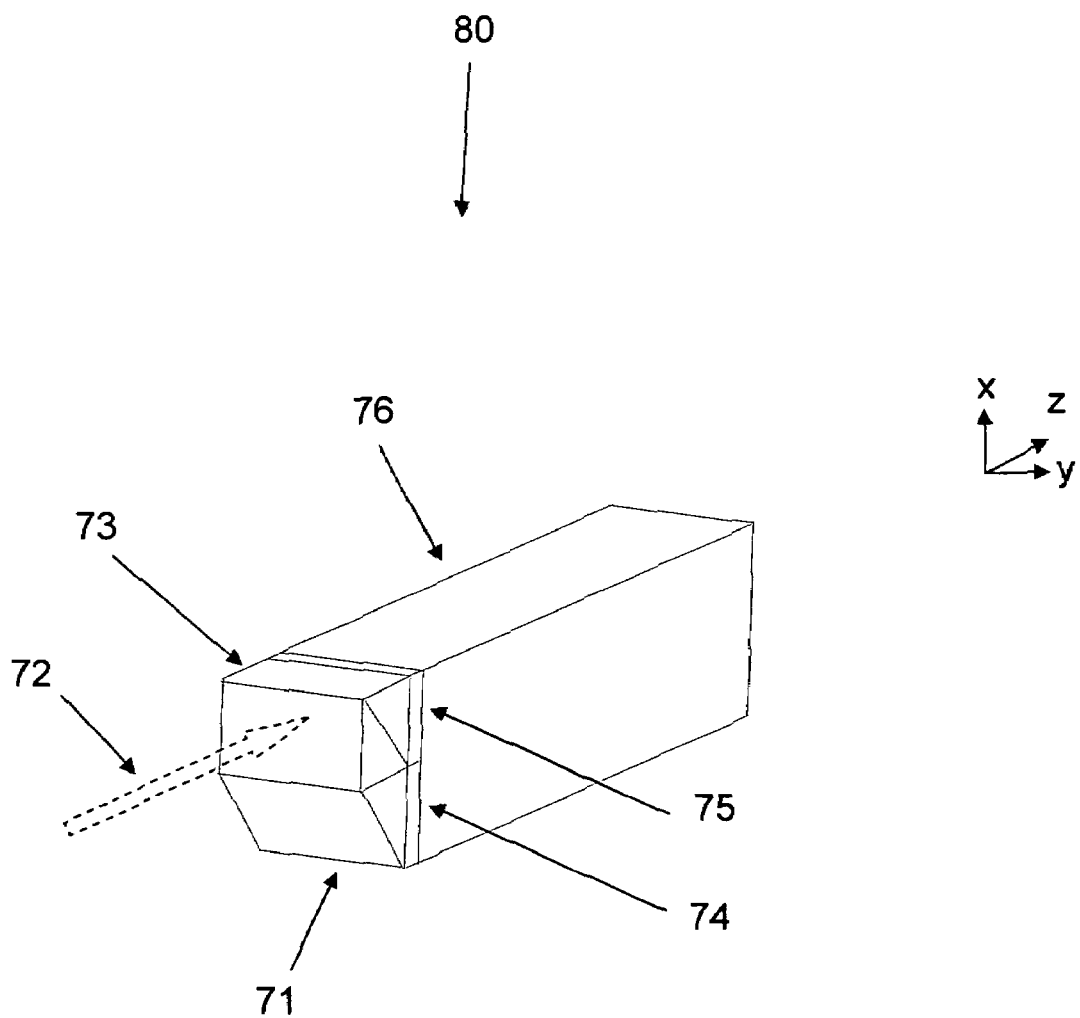
Figure 1F:
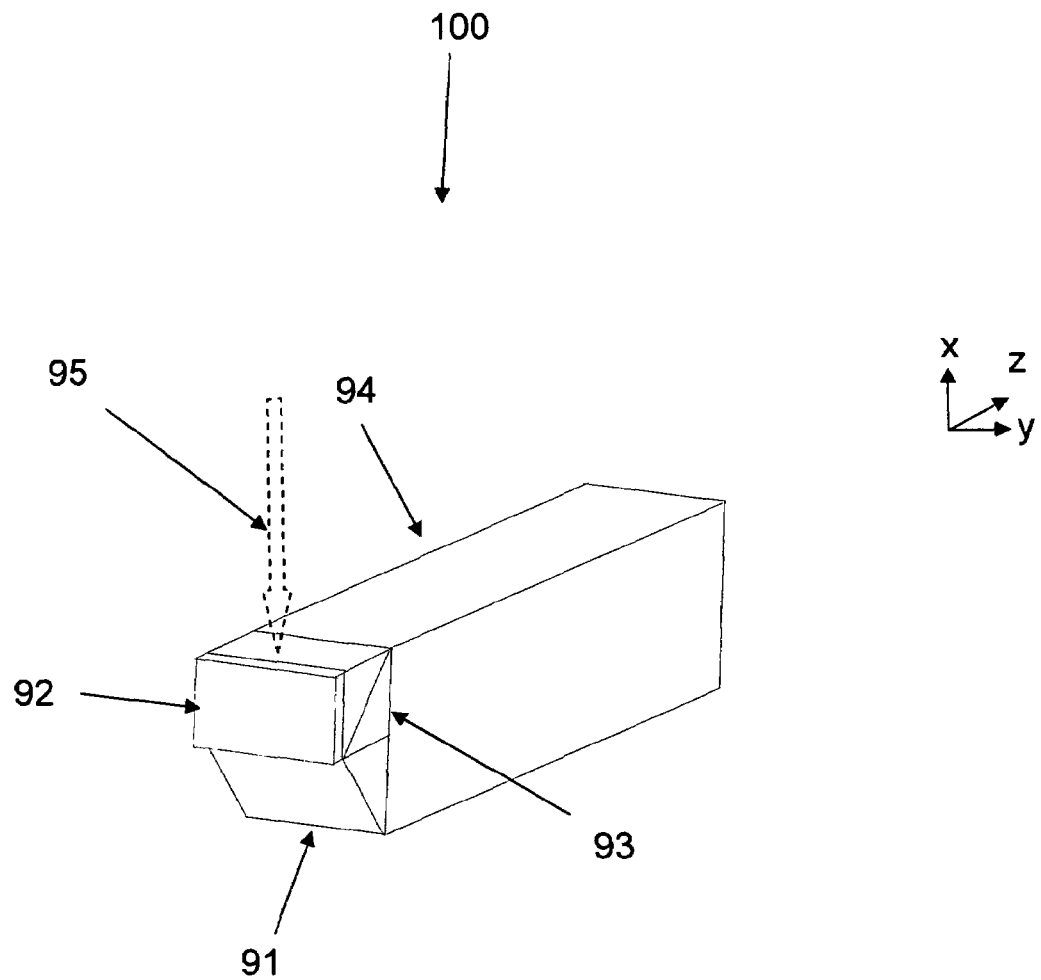
Figure 2A:
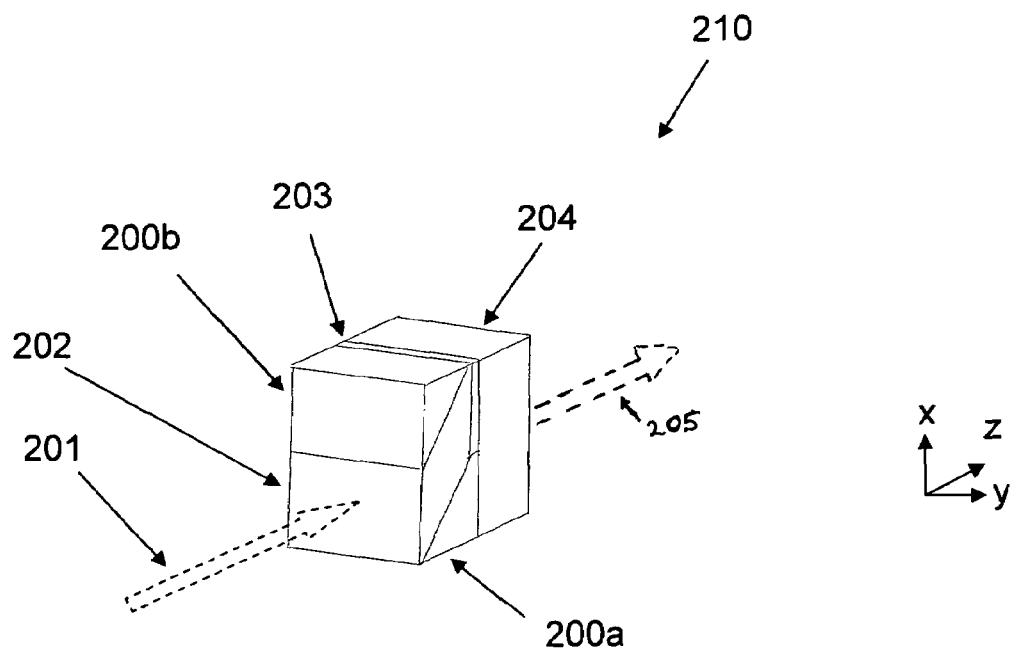
FIGS. 2A-2D show perspective views of four polarization conversion systems utilizing a homogenizer in accordance with four exemplary embodiments of the present invention.
Figure 2B:
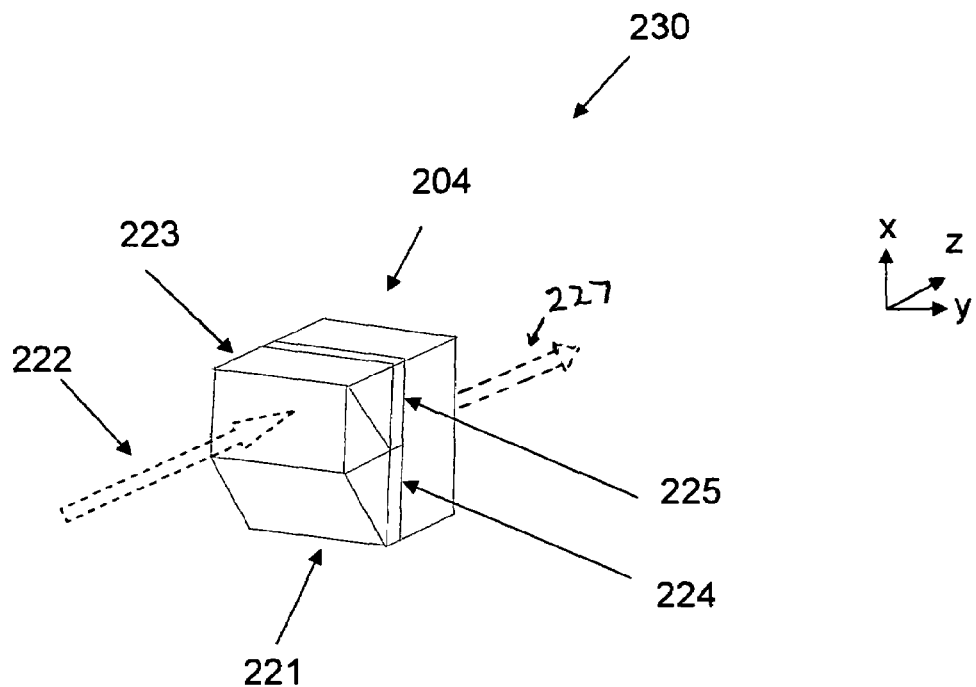
Figure 2C:
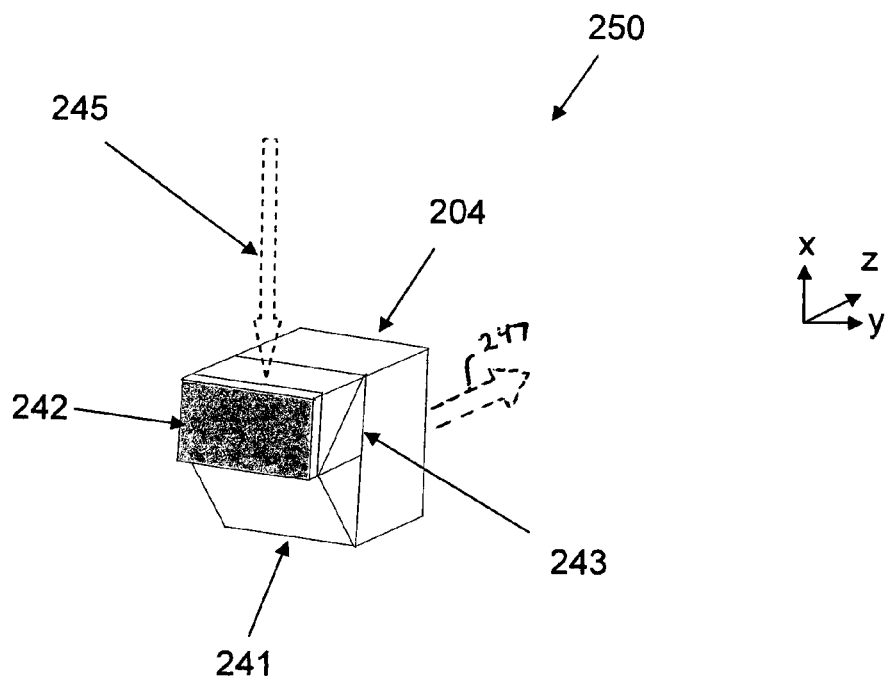
Figure 2D:
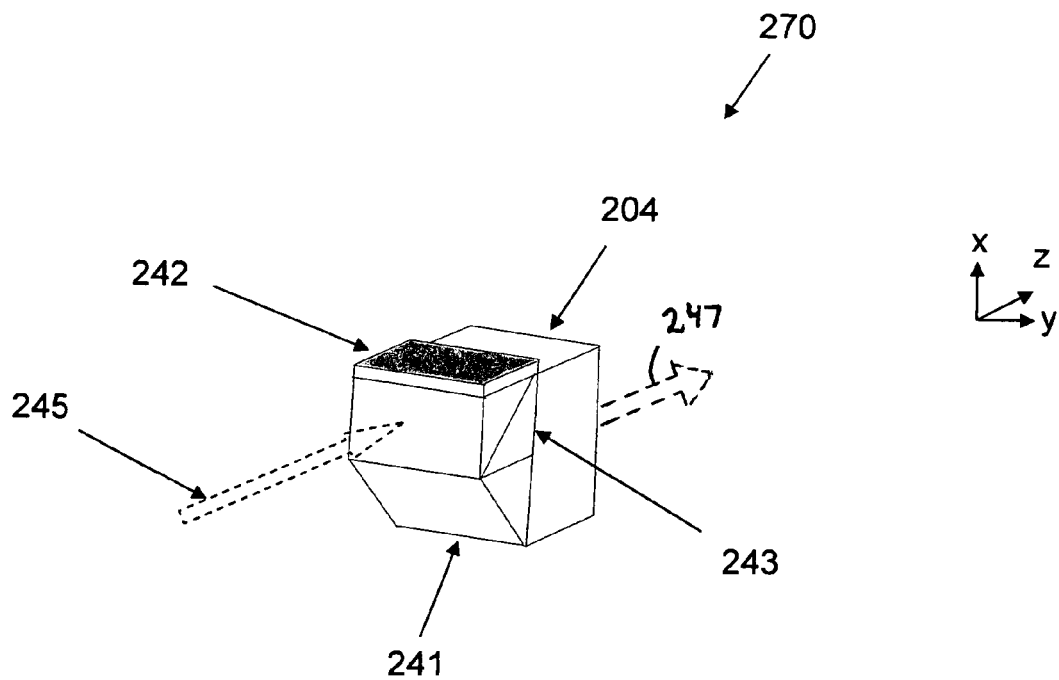
Figure 2E:
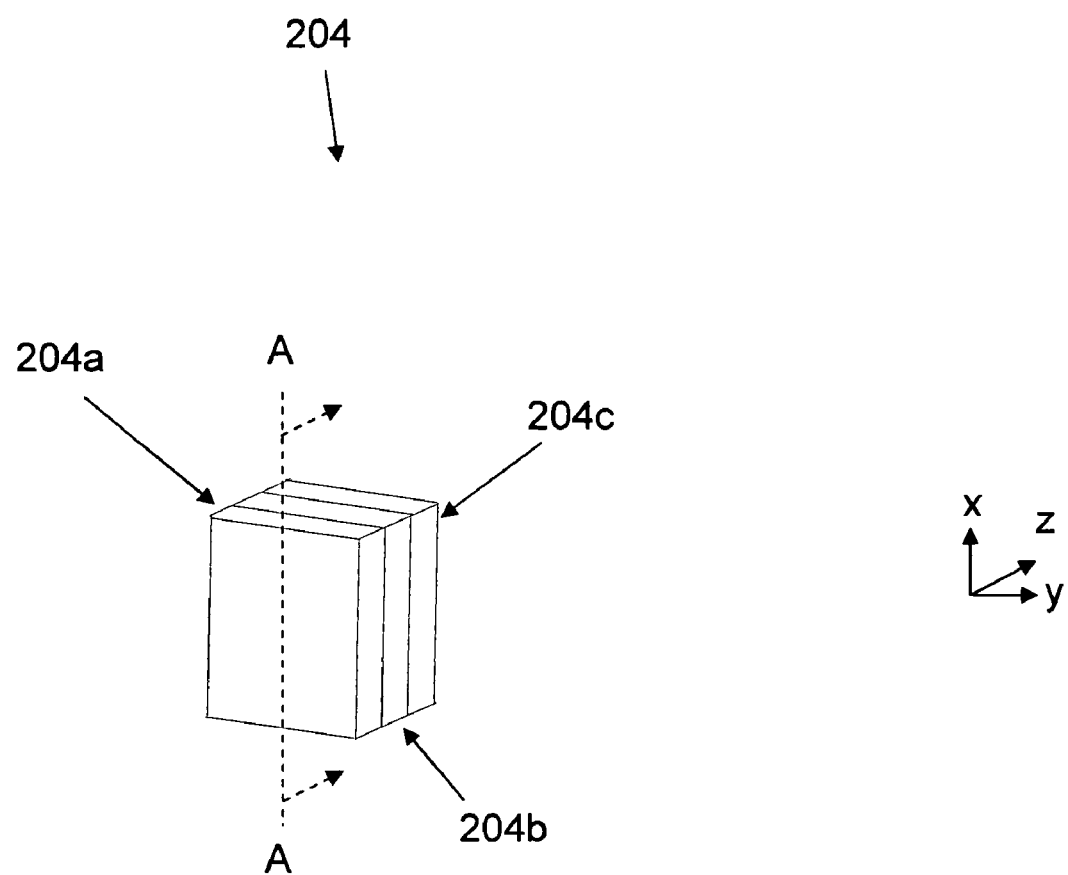
FIG. 2E shows perspective views of a first type of light homogenizer usable in PCSs of FIGS. 2A-D.

Turning now to the drawings, and in particular to FIGS. 2A-D, there are illustrated, respectively, perspective views of four PCSs 210, 230, 250 and 270 utilizing a homogenizer 204 of FIG. 2E, in accordance with four respective embodiments of the invention. In addition, homogenizers 304, 950 and 970 of FIG. 2M and FIGS. 6A-6B can be used in such systems instead of homogenizer 204 to provide a selected spatial light distribution to the next stage of an optical display system.

In accordance with a first embodiment of the invention, FIG. 2A shows a polarization conversion system 210 consisting of two polarization beam splitters 200a and 200b, a rhomb 202, a half wave plate 203 and the homogenizer 204. Input light 201 is focused into the first polarization beam splitter cube 200a as shown in FIG. 2A. Light with one polarization state (e.g., p state) is transmitted to the homogenizer 204, 304, 950 and 970 and light with orthogonal polarization state (e.g., s state) is reflected toward the second polarization beam splitter cube 200b.

At the surface of the second polarization beam splitter cube 200b, light with orthogonal polarization state (e.g., s state) is reflected toward the half wave plate 203 where its polarization state is converted into the orthogonal state (e.g., p state) and enters the light homogenizer 204 (or alternatively, homogenizer 304, 950 or 970). The substantially polarized output light 205 exits from the homogenizer 204.

The structure and operation of homogenizers 204, 304, 950 and 970 are described below in connection with FIGS. 2E-2P and FIGS. 6C-6I.

FIG. 2B shows a second embodiment of a polarization conversion system 230, which consists of a polarization beam splitter cube 223, a prism reflector 221, a half wave plate 224, spacer 225 and a light homogenizer 204.

Input light 222 is coupled into the polarization beam splitter cube 223 as shown in FIG. 2B. Light with one polarization state (e.g., p state) is transmitted to the light homogenizer 204, 304, 950 and 970 through a spacer 225 and light with orthogonal polarization state (e.g., s state) is reflected toward a prism reflector 221.

At the surface of the prism reflector 221, light with orthogonal polarization state (e.g., s state) is reflected toward the half wave plate 224 where its polarization state is converted into the orthogonal state (e.g., p state) and enters the light homogenizer 204, (or alternatively, homogenizer 304, 950 or 970). The substantially polarized output light 227 exits from the homogenizer 204.

FIG. 2C shows a third embodiment of polarization conversion system 250 which consists of a polarization beam splitter cube 243, a prism reflector 241, a quarter wave plate with a reflector 242 and a light homogenizer 204 (or alternatively, homogenizer 304, 950 or 970).

Input light 245 is coupled into the polarization beam splitter cube 243 as shown in FIG. 2C. Light with one polarization state (e.g., p state) is transmitted to the prism reflector 241, which in turn reflects it toward the light homogenizer 204, 304, 950 or 970 Light with orthogonal polarization state (e.g., s state) is reflected toward the quarter wave plate 242 where it enters and exits the quarter wave plate 242 toward the light homogenizer 204, 304, 950 or 970 with a converted polarization state (e.g., p state). The substantially polarized output light 227 exits from the homogenizer 204.

In a fourth embodiment of the invention, the quarter wave plate with a reflector 242 is placed as shown FIG. 2D.

Figure 2F:
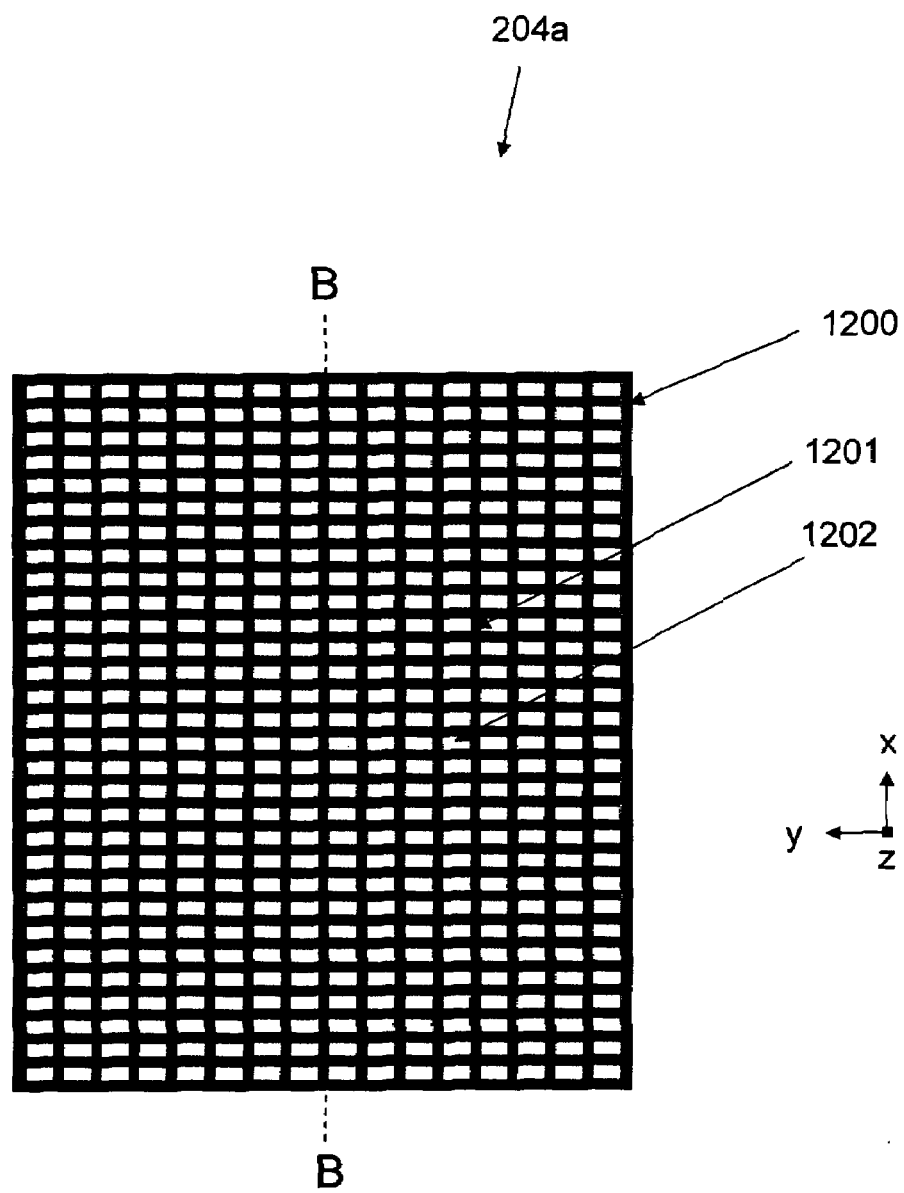
FIG. 2F shows a plan view of a two-dimensional circulation optical element array included in the homogenizer of FIG. 2E.
Figure 2G:
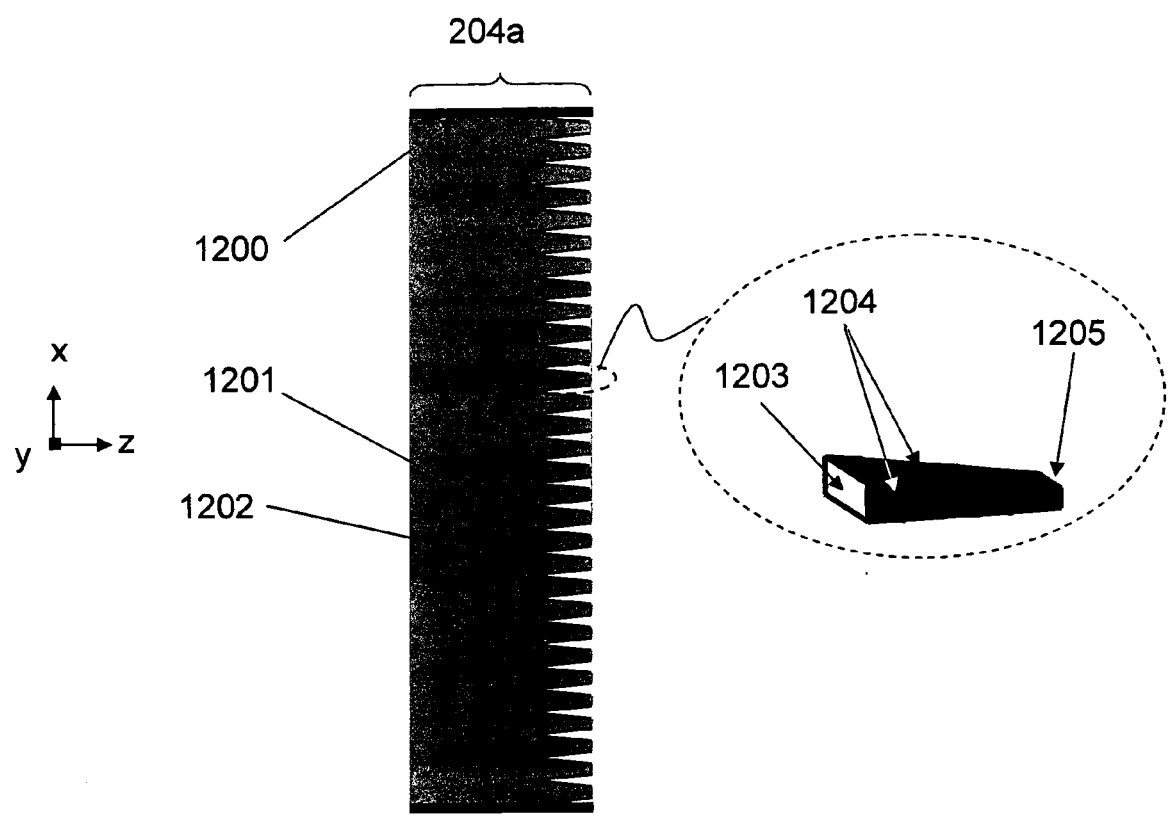
FIG. 2G shows a cross sectional view of the optical element array of FIG. 2F.
Figure 2H:
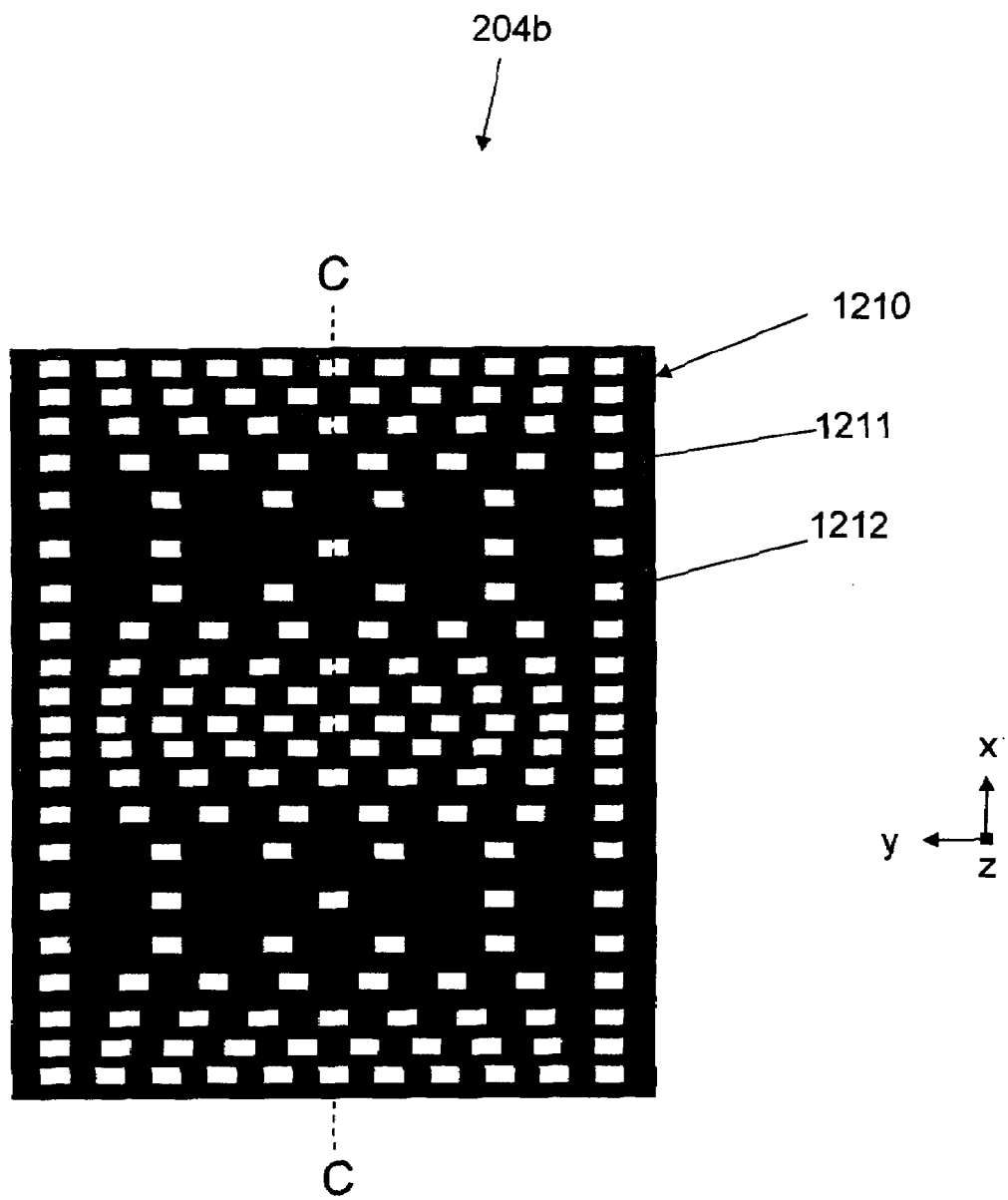
FIG. 2H shows plan view of an extraction optical element array included in the homogenizer of FIG. 2E
Figure 2I:
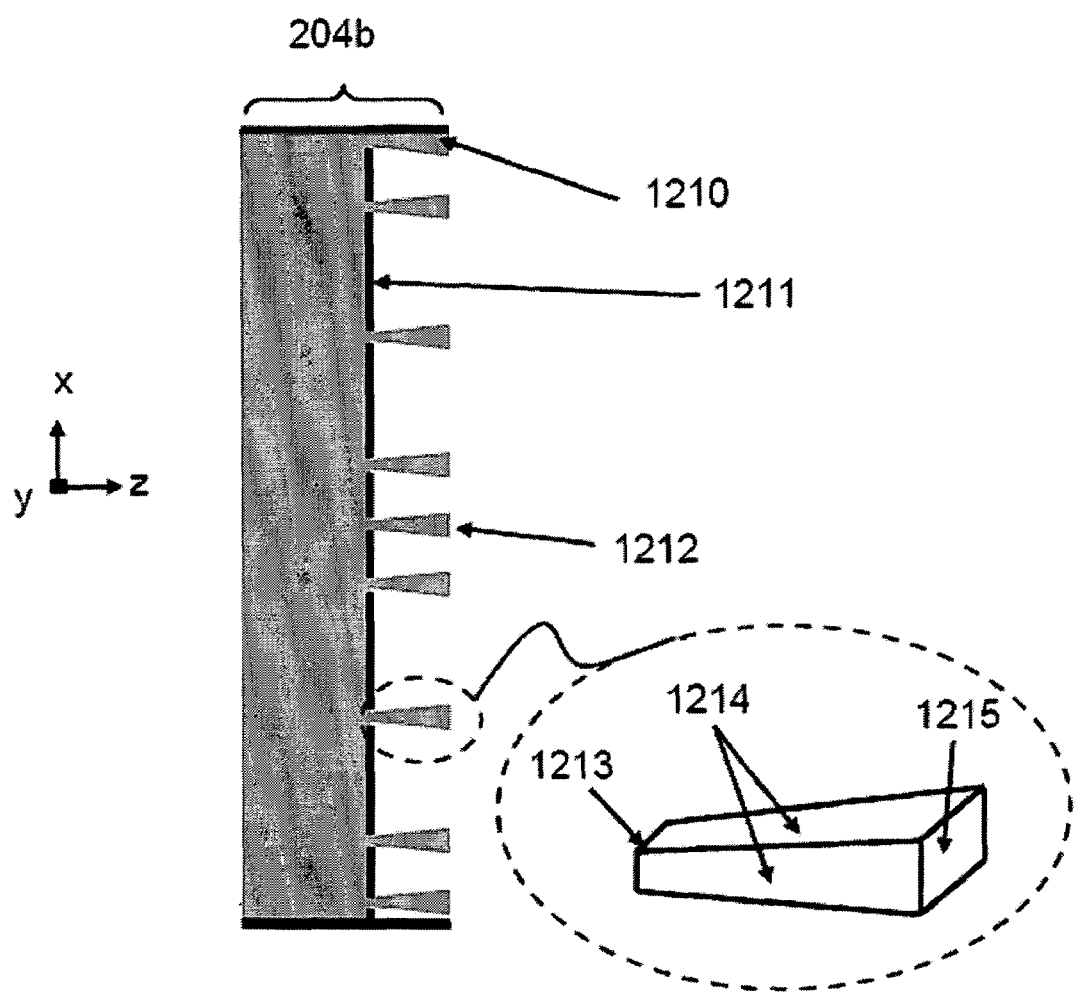
FIG. 2I shows a cross sectional view of the extraction optical element array of FIG. 2H.
Figure 2J:
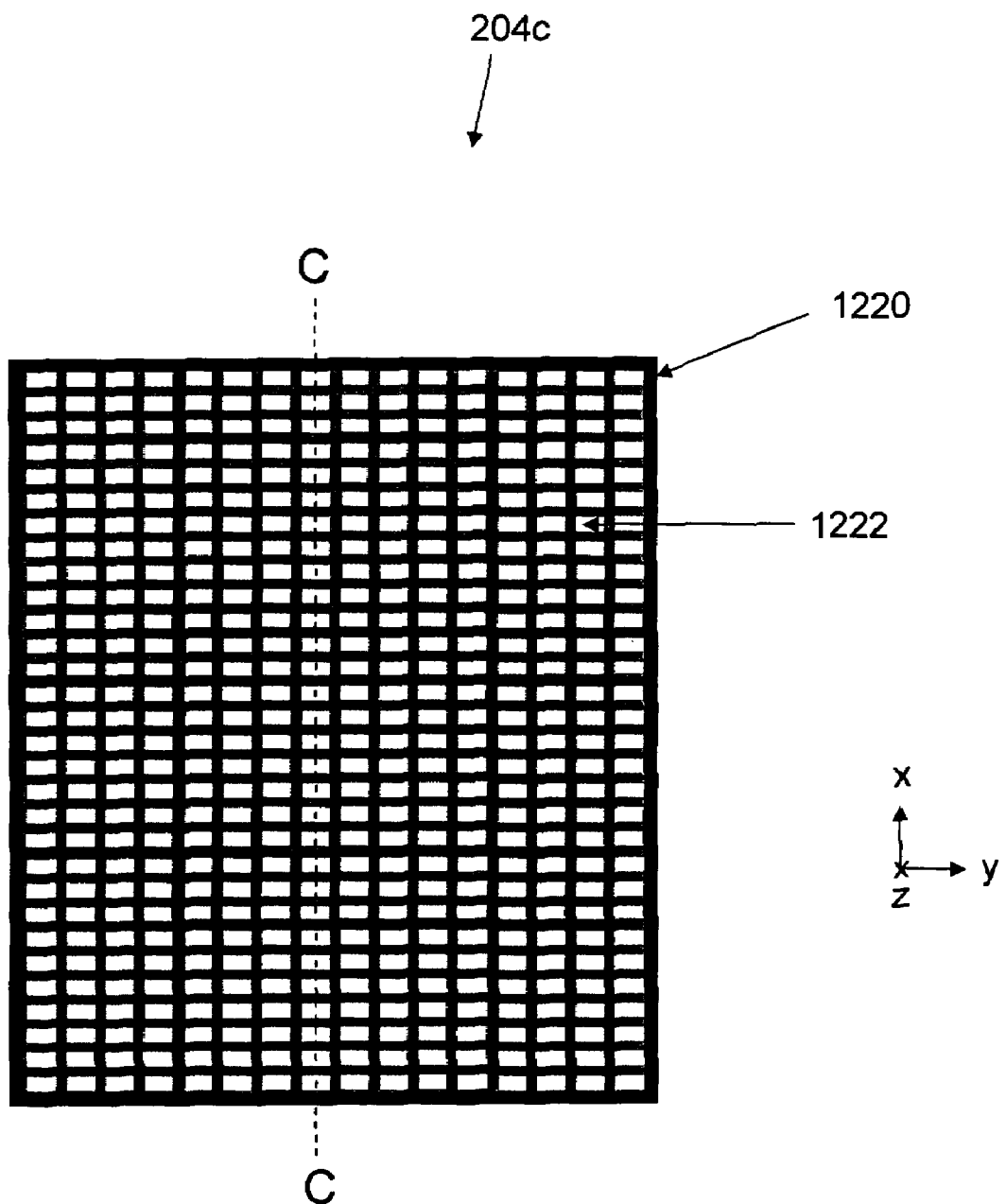
FIG. 2J shows a plan view of a collimating optical element array included in the homogenizer of FIG. 2E.
Figure 2K:
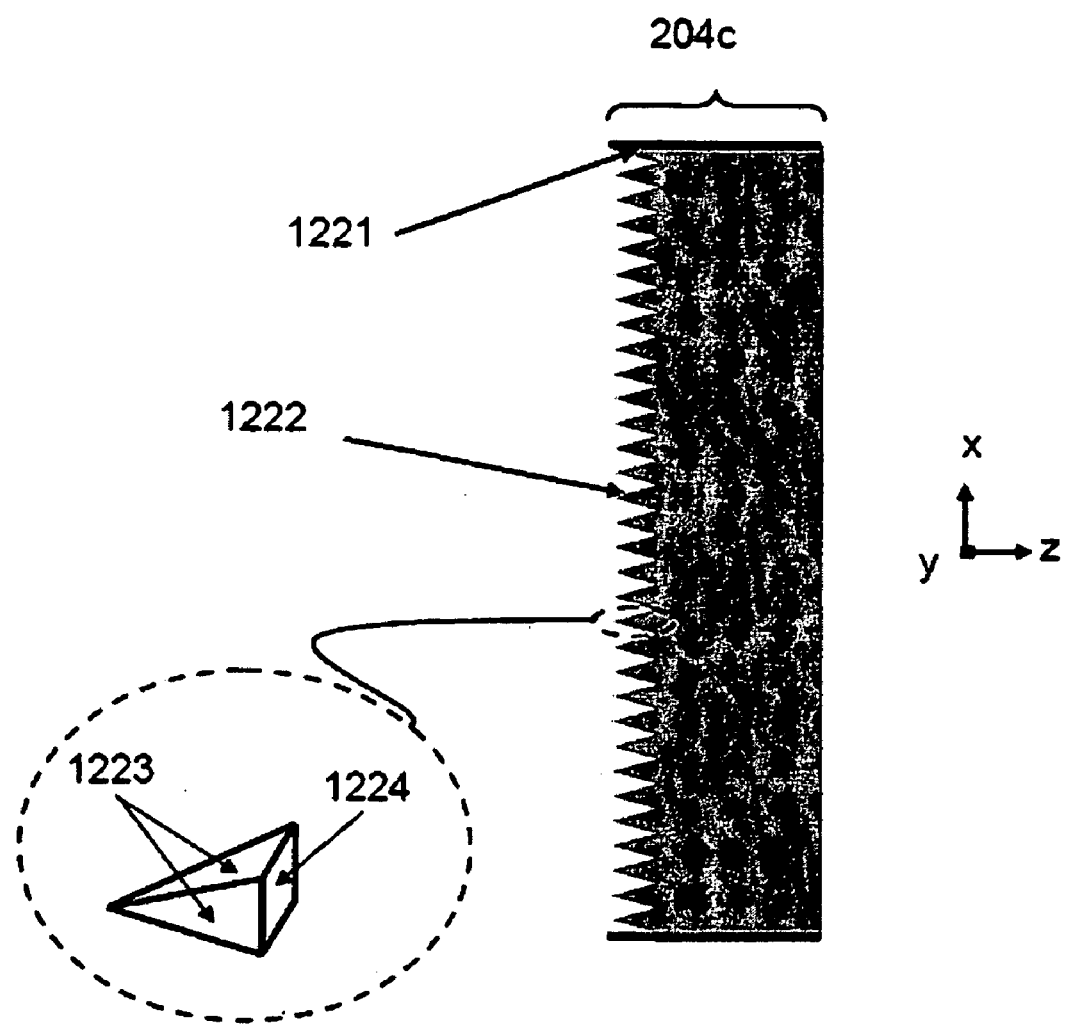
FIG. 2K shows a cross sectional view of the collimating optical element array of FIG. 2J.
Figure 2L:
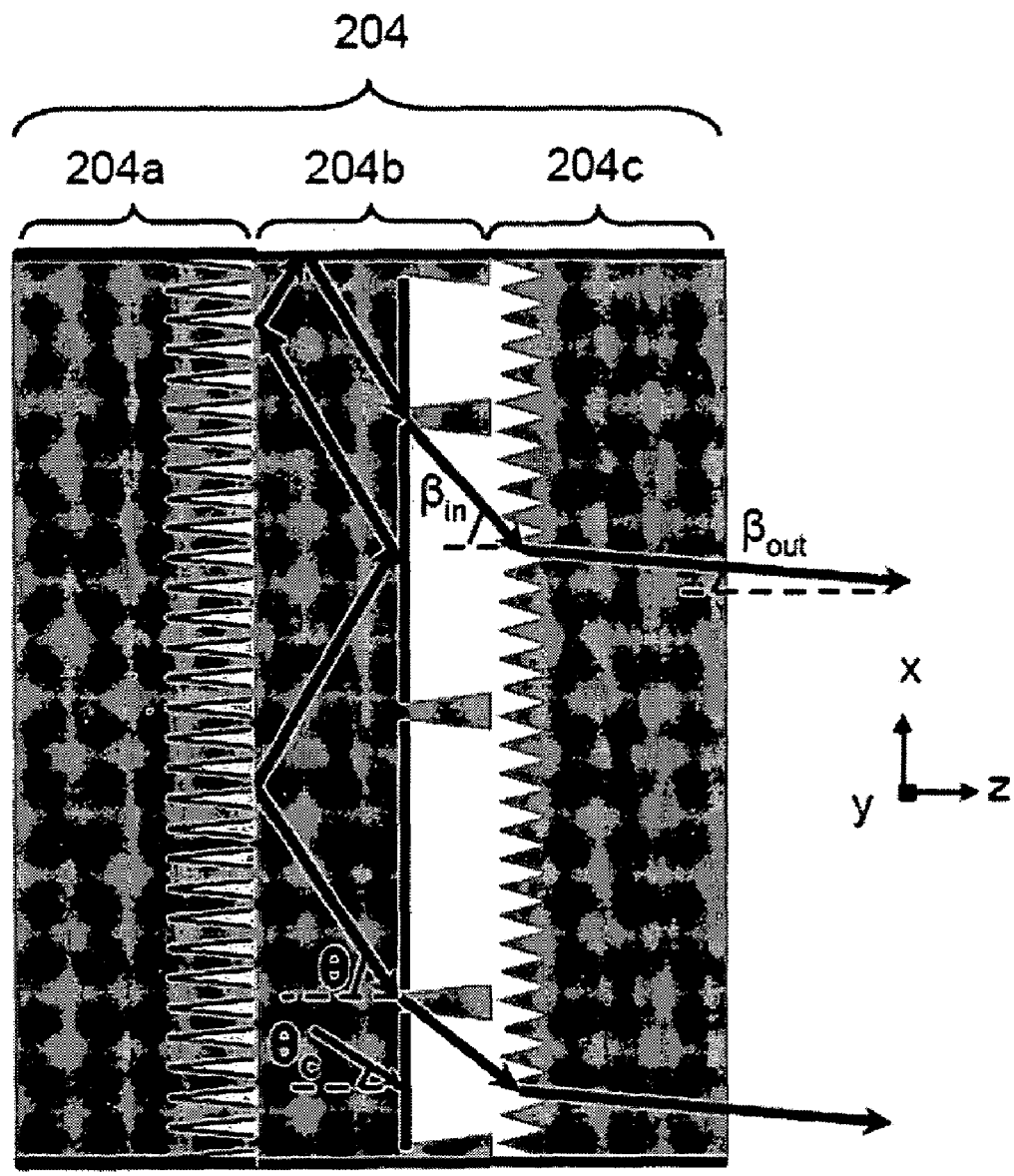
FIG. 2L shows a cross sectional view of the homogenizer of FIG. 2E.
Figure 2M:
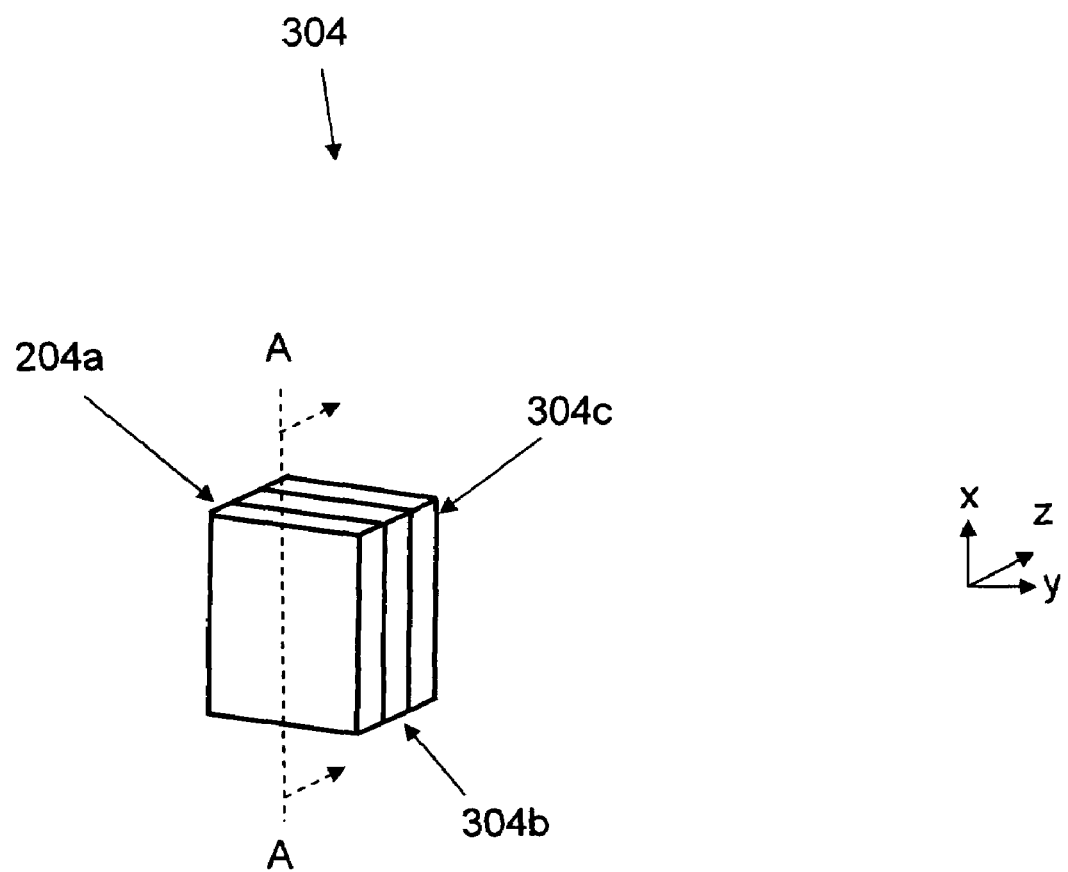
FIG. 2M shows a perspective view of a second type of light homogenizer usable in PCSs of FIGS. 2A-D.

FIGS. 2E and 2M show perspective views of two light homogenizers 204 and 304. FIG. 2E shows a perspective view of light homogenizer 204, which consists of three optical element arrays 204a, 204b, and 204c.

FIG. 2F shows a plan front view of a two-dimensional optical element array 204a, which consists of circulation micro-elements 1202 arranged in two dimensions (x and y).

FIG. 2G shows a cross-sectional view of optical element array 204a along line B of FIG. 2F with an exploded three-dimensional view of micro-element 1202. Each micro-element has four sidewalls 1204 as well as entrance 1203 and exit 1205 apertures. Neighboring micro-elements 1202 are separated by air or material with lower index of refraction than that of the micro-element 1202 itself. Reflective layer 1200 is bonded to or deposited on the four sidewalls of array 204a and sidewalls of circulation micro-elements 1202 are coated with a reflective layer 1201.

FIGS. 2H and 2J show front plan views of two-dimensional optical element arrays 204b and 204c, which consist of extraction micro-elements 1212 and collimating micro-elements (i.e., micro-prisms) 1222, respectively, arranged in two dimensions (x and y).

FIGS. 2I and 2K show cross-sectional views of optical element arrays 204b and 204c along line C of FIGS. 2H and 2J. Exploded three-dimensional views of micro-element 1212 and 1222 are shown with their corresponding sidewalls 1214 and 1223 as well as entrance 1213 and 1223 and exit 1215 and 1224 apertures. Reflective layers 1210 and 1221 are bonded to or deposited on the four sidewalls of array 204b and 204c. In addition, reflective layer 1211 is deposited on areas between extraction micro-elements 1212.

As shown in FIG. 2K, each micro-prism 1202 has four sidewalls 1223 (two sidewalls are shown in the perspective view of the exploded micro-prism) as well as entrance 1223 and exit 1224 apertures. Sidewalls of micro-elements 1202, 1212, and 1222 of arrays 204a, 204b and 204c are aligned with the axes of polarization beam splitter cubes 200, 223 and 243 so that the polarization state of light entering the homogenizer 204 is maintained.

FIG. 2L shows a cross sectional-view of homogenizer 204 along plane A of FIG. 2E. Homogenizer 204 consists of circulation optical element array 204a, extraction optical element array 204b and micro-prism array 204c, which are attached, glued, or bonded together as shown in FIGS. 2E and 2L.

Figure 2N:
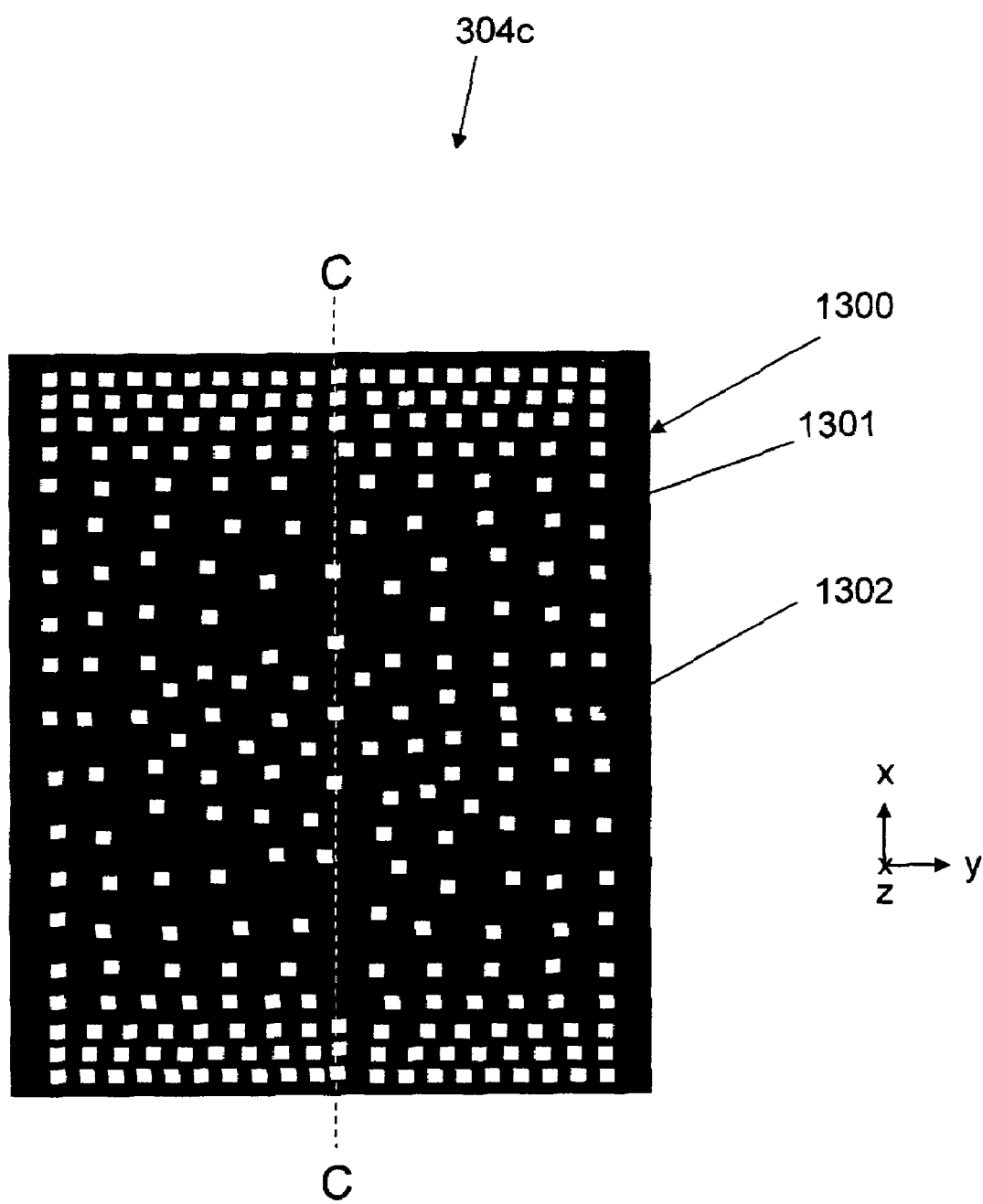
FIG. 2N shows a front plan view of an extraction optical element array included in the homogenizer of FIG. 2M.
Figure 2O:
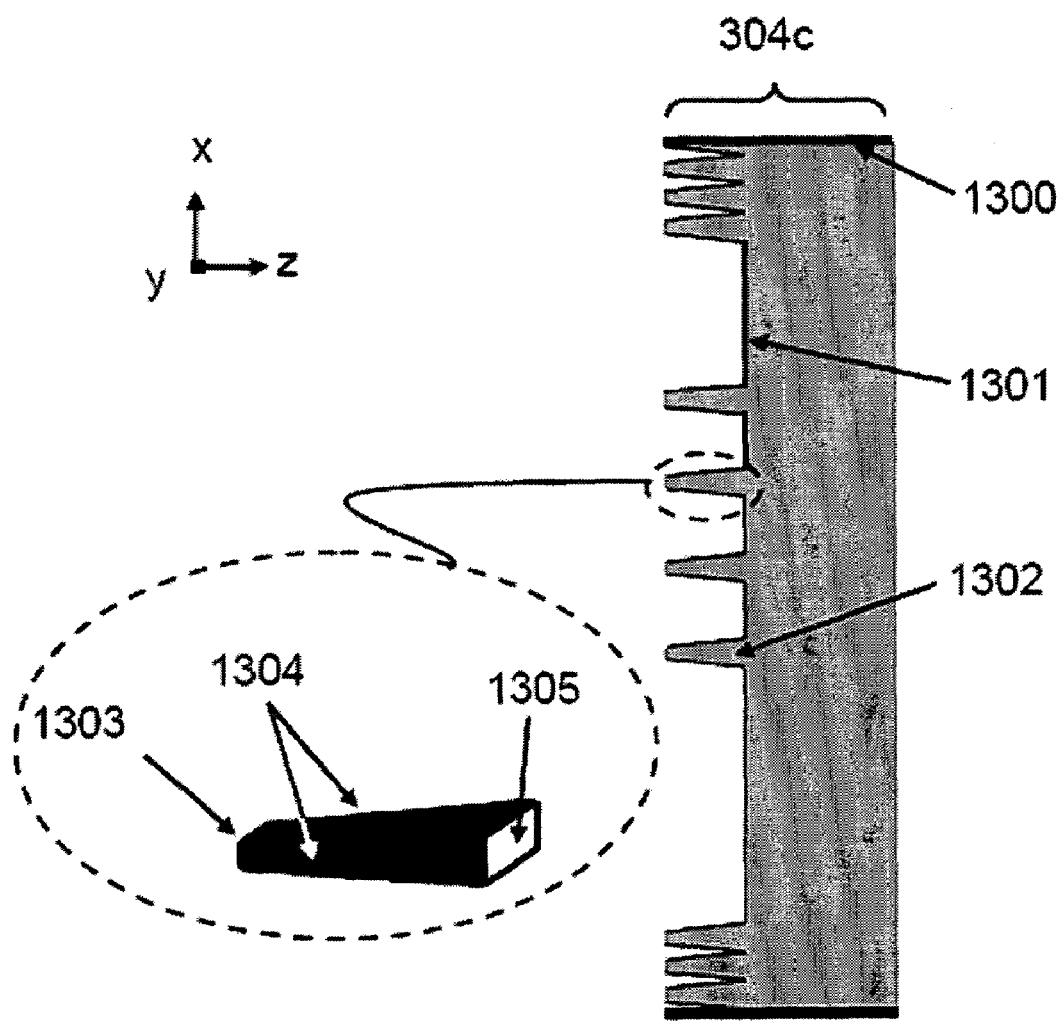
FIG. 2O shows a cross sectional view of the optical element array of FIG. 2N.
Figure 2P:
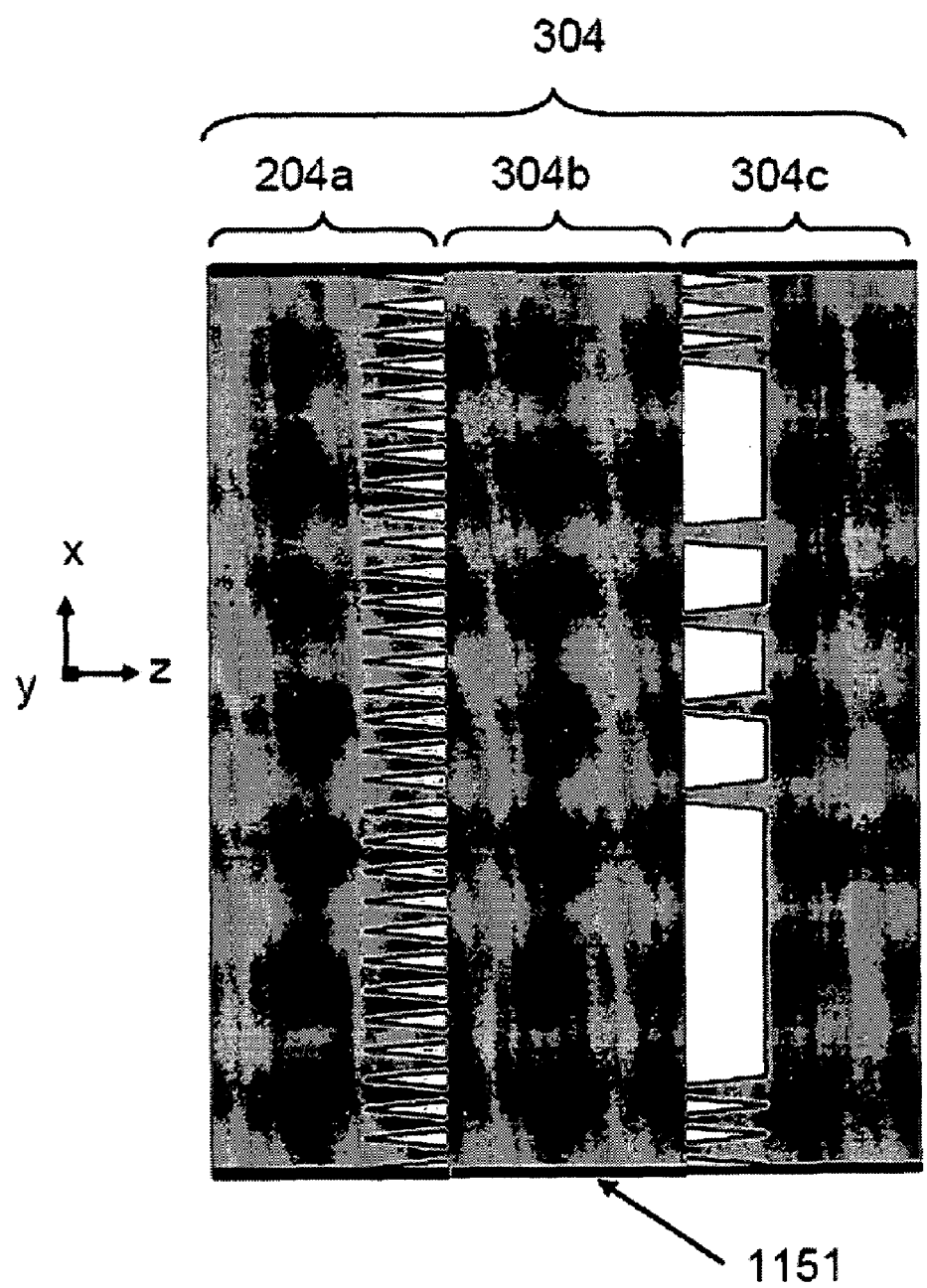
FIG. 2P shows a cross sectional view of the second type of homogenizer shown in FIG. 2M FIGS. 3A-3C show perspective views of three polarization conversion systems in accordance with three additional exemplary embodiments of the present invention.

FIGS. 2M and 2P show a perspective view and corresponding cross-sectional view, respectively, of homogenizer 304 along line A of FIG. 2M. Homogenizer 304 consists of circulation optical element array 204a, plain glass plate 304b with reflective layer on its four sidewalls and extraction optical element array 304c, all which are attached, glued, or bonded together as shown in FIGS. 2M and 2P.

FIGS. 2N and 2O show a front plan view and corresponding cross-sectional view, respectively, of extraction optical element array 304c along line C of FIG. 2N.

The operation of homogenizers 204 and 304 is based on circulating the input light within the body of an optical element array 204b or glass plate 304b using circulating optical element array 204a. The circulated light is uniformly extracted out of the body of the micro-guide 204b or glass plate 304b using extraction micro-elements 1212 and 1302 of optical element arrays 204b and 304c. Light is received by optical element array 204a and impinges on the circulation micro-elements 1202 within the circulation array 204a which increases the cone angle of preferably all received light so that it is guided within the body of optical element array 204b and 304b via total internal reflection (TIR) and reflection unless it is extracted by micro-elements 1212 and 1302. In other words, the function of circulation array 204a is to deliver light to array 204b and plate 304b with an incidence angle θ larger than the critical angle $\theta_c$ of the array 204b and plate 304b.

Polarization beam splitters 200a, 200b, 223, and 243 (FIGS. 2A-2D) split the light they receive into two sub-beams with two hot spots at the center of each sub-beam. In order to get a uniform spatial distribution of light energy over the PCS output cross section, the density of extraction micro-elements 1212 and 1302 within arrays 204b and 304c is designed to be inversely proportional to the intensity of light within the body of the optical element arrays 204b and 304b. Extraction micro-elements 1212 and 1302 can be distributed non-uniformly or randomly within arrays 204b and 304c and can be distributed to get a selected distribution of light in terms of intensity and cone angle.

FIGS. 2H and 2N show that the density of extraction micro-elements 1212 and 1302 is low where input light is high and increase toward array edges and center. As a result, the light delivered by extraction array 204b and 304c has a highly uniform cross-sectional distribution of intensity and angle. Light extracted by micro-elements 1212 enters the micro-prism array 204c with an angle $\beta_{in}$ and exits with an angle $\beta_{out}$, thus, a collimated and uniform light beam is delivered by homogenizer 204.

In homogenizer 304 (FIG. 2P), the collimation of extracted light is achieved by the collimating nature of the extraction micro-elements 1302. By changing the distribution of extraction micro-elements 1212 and 1302 and their design parameters such as size and taper, it is possible to deliver light with a certain spatial distribution in terms of angle and intensity. For example, higher spatial intensity near homogenizer edges can be used to compensate for the usual lower light intensity near screen edges in projection display systems.

The polarization conversion systems (PCSs) 210, 230, 250 and 270 disclosed herein have five key advantages over known polarization conversion systems (FIGS. 1A-F). First, the polarization conversion systems disclosed herein can use larger input apertures (i.e., larger cross-sectional input area of the PCS) while maintaining the etendue of the input light or that of a lamp/reflector. This leads to increasing the efficiency of the polarization conversion system and displays utilizing such PCSs. Second, the PCSs disclosed herein provide more control over the spatial light distribution and uniformity in terms of intensity and exit divergence angle when compared to that of known PCSs. The capability of designing and distributing individual micro-elements within an extraction optical element array provides control over the spatial distribution of light intensity and cone angle over the entire cross section of the exit aperture of a PCS. For example, PCSs can provide more light at higher angles, thus, overcoming the typical angle dependent loss in a conventional display system and leading to more uniform light intensity at the screen. Third, higher coupling efficiency between the light source and the display panels (i.e., modulator) in a display system can be provided by the use of collimating elements within the inventive PCS, which results in a more efficient use of light by the light valve, thus, reducing the required number of light sources and/or their power. In this case, collimating optical element arrays do not increase the etendue of light beam delivered to the light valve, thus enhancing coupling efficiency and increasing display brightness.

Fourth, the PCSs disclosed herein provide a superior level of compactness and light-weight. The length of the inventive PCSs can be lower than the lengths of known PCSs by one or more orders of magnitude resulting in very compact light-weight display and illumination systems. In addition, the high PCS efficiency enables the use of small size display panels ($\leq 0.5"$) which results in using smaller optical components such as the projection lens, thus, leading to very compact projection systems.

Fifth, lower display system cost is achieved by using the inventive PCSs disclosed herein due to the reduced size of the optical components used within the projection display system. As the size of optical components is reduced, their cost is reduced and the cost of the overall system is reduced.

Figure 3A:
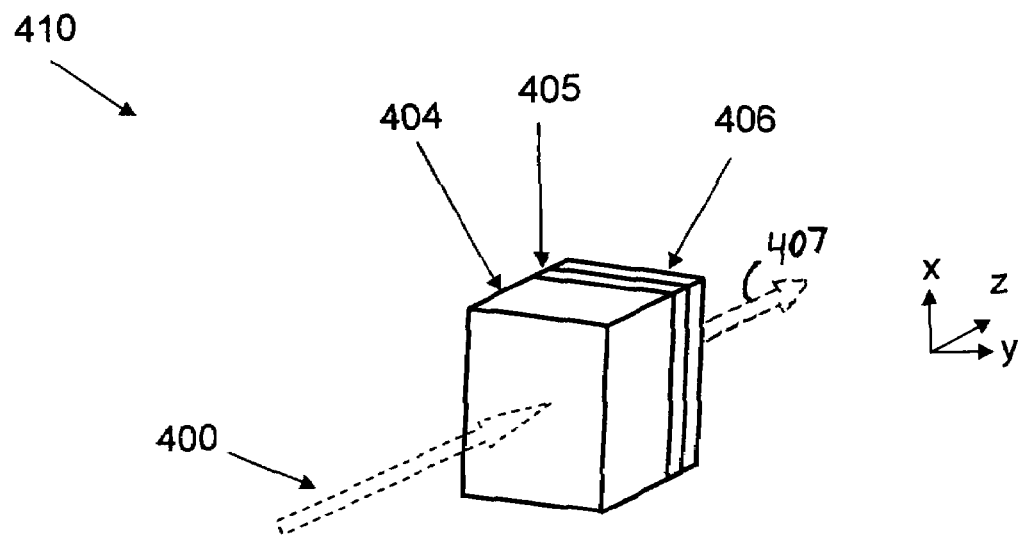
FIG. 3D shows a perspective view of a homogenizer usable in the PCSs shown in FIGS. 3A-3C.
FIG. 3E shows a front plan view of a circulation tunnel optical element array of the homogenizer of FIG. 3D.
FIG. 3F shows a cross-sectional view of the optical element array shown in FIG. 3E.
Figure 3B:
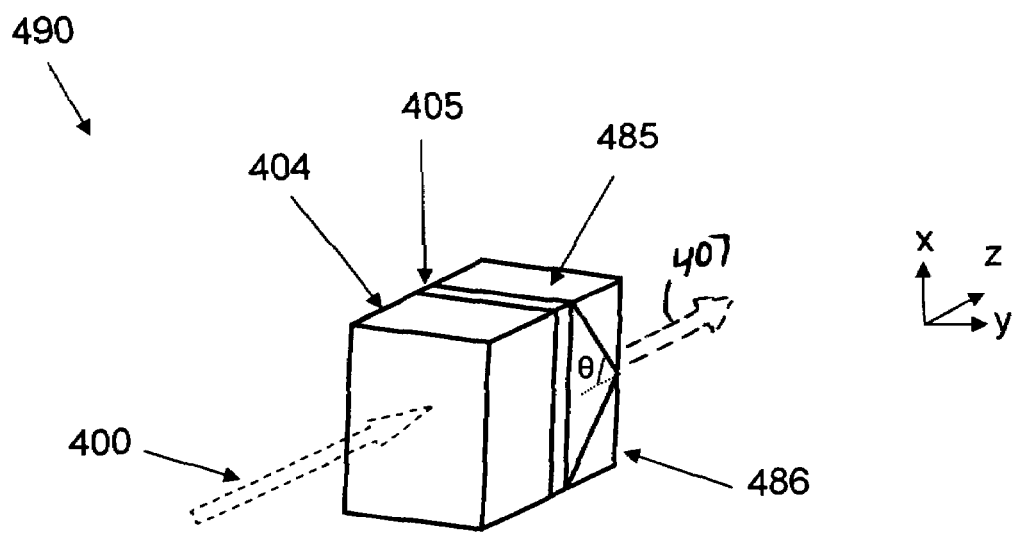
Figure 3C:
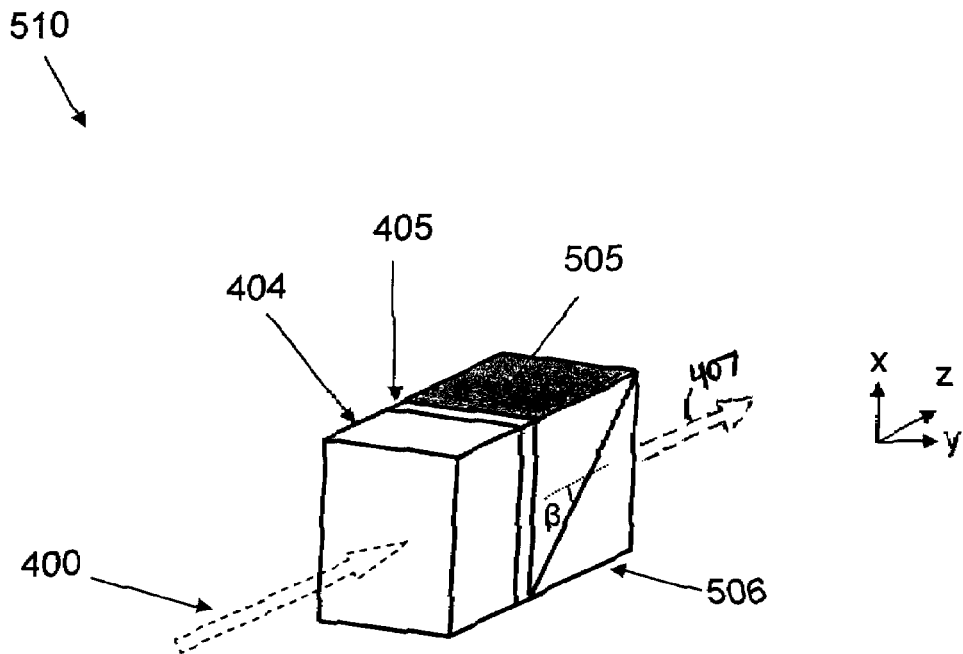

FIGS. 3A-3C show perspective views, respectively, of three polarization conversion systems 410, 490 and 510 utilizing a homogenizer 404, which provides the desired spatial light distribution to the next stage in an optical display system, in accordance with further embodiments of the present invention.

Homogenizers 204 and 304 of FIGS. 2E and 2M can be used alternatively to provide the function of homogenizer 404 of FIGS. 3A-3C as long as the distributions of extraction micro-elements within arrays 204b and 304c are modified to account for the spatial intensity of input light 400, which is related to the spatial intensity of light within the body of arrays 204b and 304b.

Figure 3D:
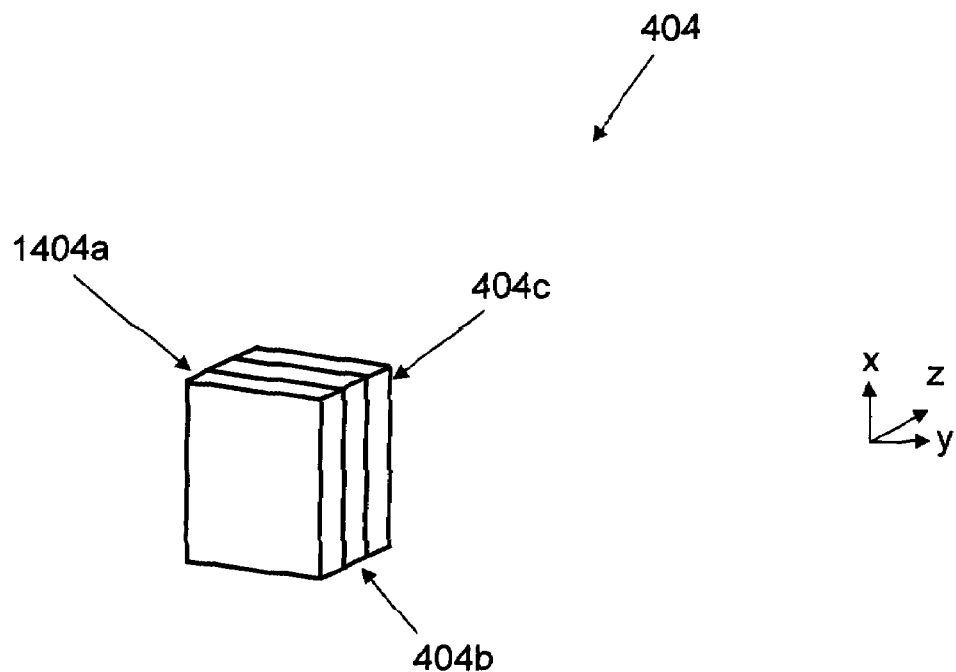

The input light beam 400 in FIGS. 3A-3C is not divided into two sub-beams as it is the case of input light beam of FIGS. 2A-2D. As shown in FIG. 3D, homogenizer 404 of FIGS. 3A-3C has a structure similar to either that of homogenizers 204 or 304 and uses a circulation micro-tunnel array 1404a of FIGS. 3E-3F, which performs the same function as that of circulation optical element array 204a. Either arrays 204b and 204c or arrays 304b and 304c can be used to perform the functions of arrays 404b and 404c of FIG. 3D.

Figure 3E:
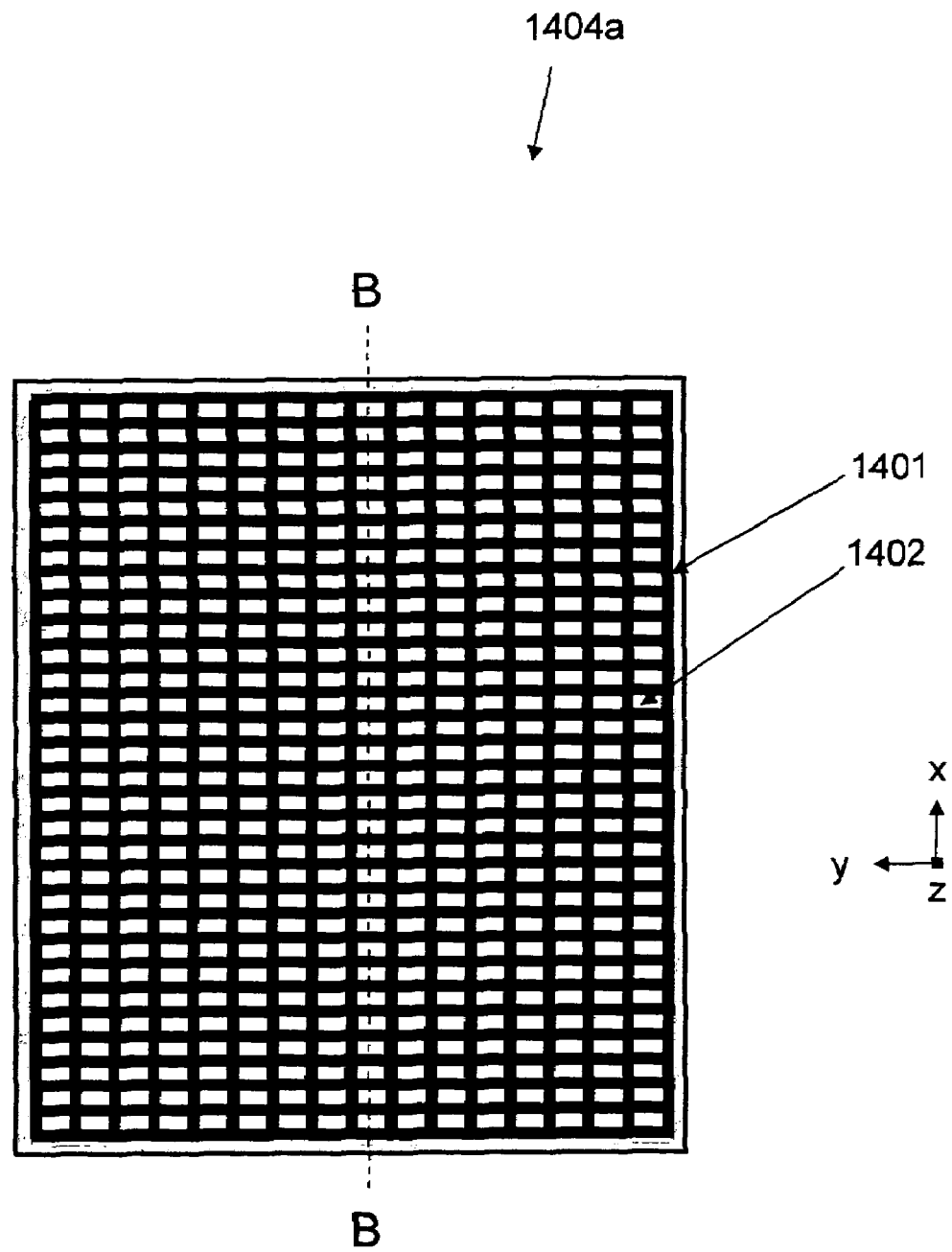
Figure 3F:
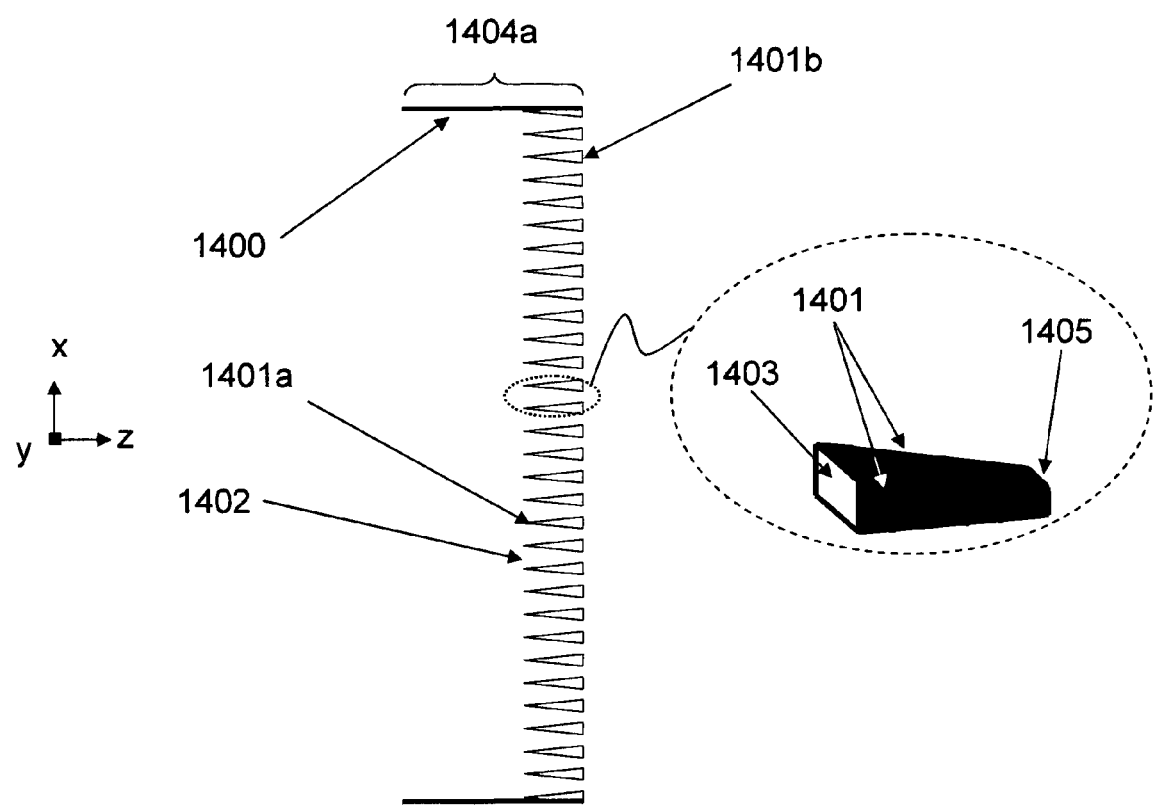

FIG. 3E shows a front plan view of array 1404a and FIG. 3F shows a cross-sectional view of array 1404a along line B of FIG. 3E. Micro-tunnels 1402 are hollow with a reflective coating 1401a on their sidewalls 1401 and have entrance 1403 and exit 1405 apertures as shown in FIG. 3F. The array 1404a is coated with a reflective layer 1400 on its four edges. The reflective layers described herein can be deposited aluminum or any other suitable reflective material.

Circulation arrays 204a and 1404a of homogenizers 204, 304 and 404 accepts the input light from a light source such as an arc lamp and delivers it to the next stage for circulation. Since these arrays 204a and 1404a are coated with reflective layers 1201 and 1401b on the sidewalls of its micro-elements 1202 and the front surface of its micro-tunnels 1402, a substantial amount of the light traveling in the opposite direction (i.e. in the negative z direction) is reflected back toward the circulation arrays 204b, 304b and 404b. Thus, array 204a and 1404a acts as a one directional aperture that passes a substantial amount of light entering from one side and reflects a substantial amount of light entering from the opposite side. This kind of unidirectional aperture provides more efficient polarization conversion systems 410, 490 and 510 than known polarization conversion systems 25, 35 and 45 of FIGS. 1A-1C.

According to one embodiment, FIG. 3A shows a polarization conversion system 410 consisting of a homogenizer 404, a quarter wave plate 405 and a reflective polarizer 406 such as a Proflux brand from Moxtek company. Input light 400 is focused into the homogenizer 404 as shown in FIG. 3A and travels toward the reflective polarizer 406. Light with one polarization state (e.g., p state) is transmitted through reflective polarizer 406 to the next stage and light with orthogonal polarization state (e.g., s state) is reflected toward the homogenizer 404 where it passes through the quarter wave plate 405 and impinges on homogenizer 404. This light is reflected or refracted back toward the quarter wave plate 405 by the reflective layers and refractive micro-elements of homogenizer 404 where its polarization state is converted into the orthogonal state (e.g., p state) and passes through the reflective polarizer 406, and is emitted as substantial polarized output light 407.

FIGS. 3B and 3C show two polarization conversion systems 490 and 510 similar to that of FIG. 3A except for the replacement of the reflective polarizer 406 by an assembly of two polarization beam splitters 485 and 486 each disposed at an angle θ of 45° to the axis of the light path (FIG. 3B) and an assembly of a mirror 505 with a single polarization beam splitter 506 disposed at an angle β of 45° to the axis of the light path (FIG. 3C). The light path in FIGS. 3A-3C is parallel to the z-axis. When compared to polarization conversion systems (PCSs) of FIG. 2, PCSs 410, 490 and 510 of FIG. 3 provide more compactness and collect more light due to doubling the size of the input aperture of the PCSs of FIG. 3. In addition, polarization conversion systems 410, 490 and 510 have the same key advantages as these of PCSs of FIG. 2.

Figure 4A:
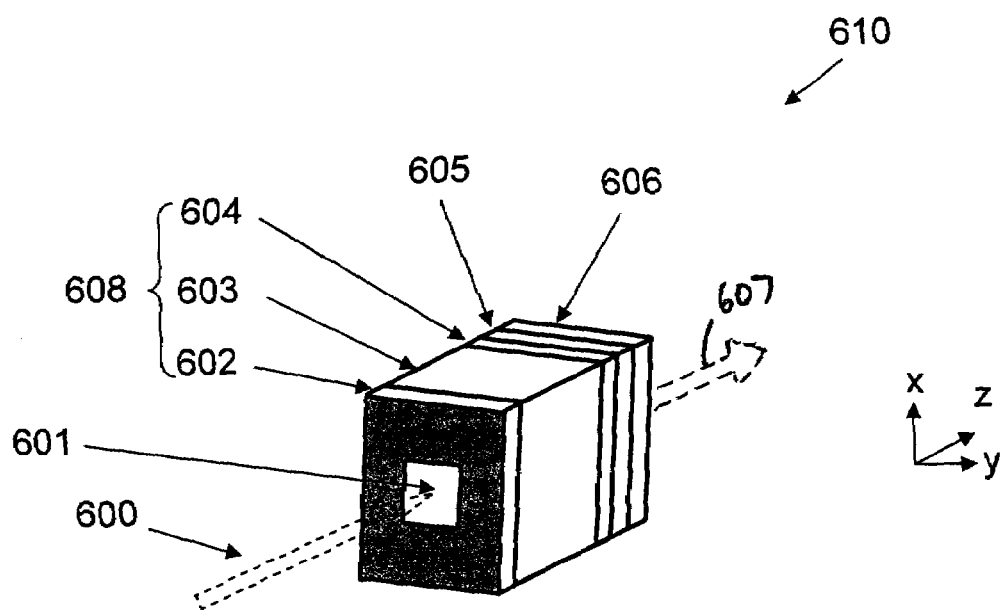
FIGS. 4A-4D show perspective views of four polarization conversion systems in accordance with four more exemplary embodiments of the present invention.
Figure 4B:
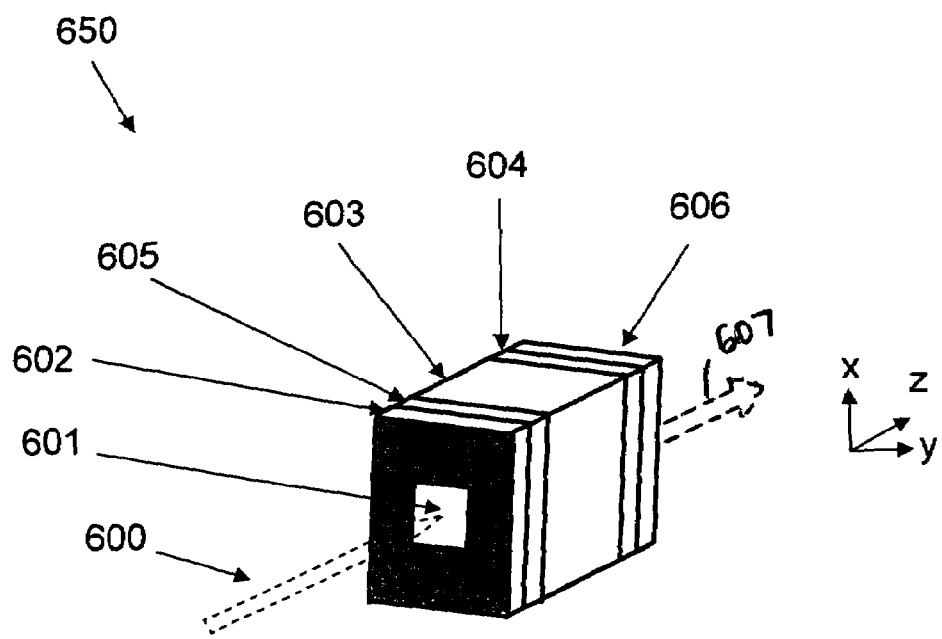
Figure 4C:
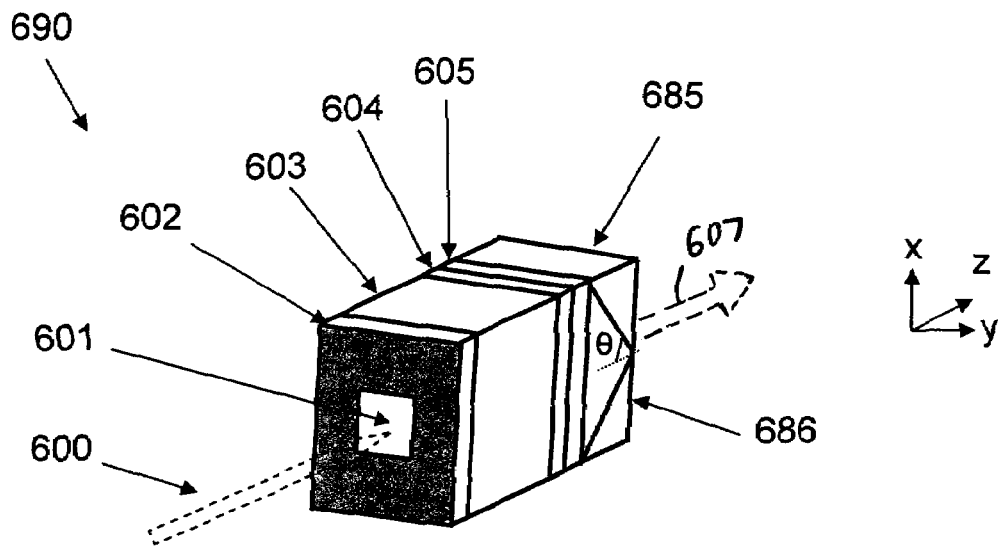
Figure 4D:
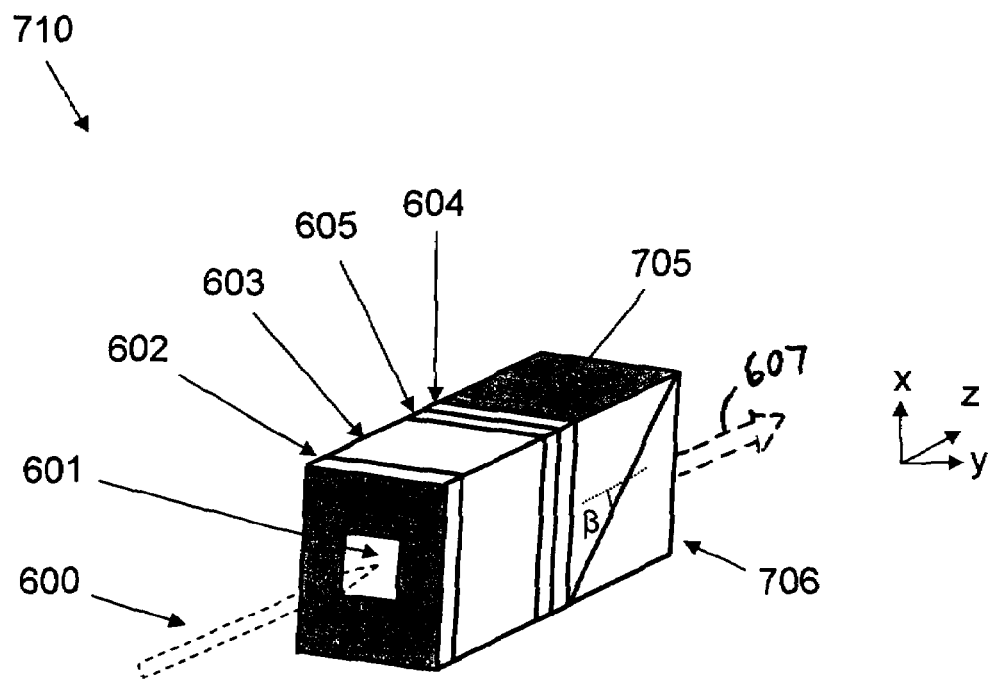

FIGS. 4A-4D show perspective views, respectively, of four polarization conversion systems 610, 650, 690 and 710, which utilize a compact homogenizer 608 to provide the required spatial light uniformity, in accordance with further embodiments of the present invention. Homogenizer 608 consists of three elements, a reflective plate 602, light guide 603 and optional collimating optical element array 604 as shown in FIGS. 4I-4M. The three elements 602, 603 and 604 of homogenizer 608 can be arranged within the PCSs 610, 650, 690 and 710 as a block followed by the quarter wave plate 605 (FIGS. 4A and 4C) and can be distributed within the PCSs 610, 650, 690 and 710 in various ways such as shown in FIGS. 4B and 4D. In general, the quarter wave plate 605 can be placed either between reflective plate 602 and light guide 603, between light guide 603 and optical element array 604, or after optical element array 604.

FIG. 4A-4B show polarization conversion systems 610 and 650 consisting of a homogenizer 608, a quarter wave plate 605 and a reflective polarizer 606. Both polarization conversion systems 610,650 are similar except for the placement of quarter wave plate 605.

FIGS. 4C and 4D show two polarization conversion systems 690 and 710 that do not use a reflective polarizer but rather use an assembly of two polarization beam splitters 685 and 686 each disposed at an angle θ of 45° to the axis of the light path (FIG. 4C) and an assembly of a mirror 705 with a single polarization beam splitter 706 disposed at an angle β of 45° to the axis of the light path (FIG. 4D).

Figure 4E:
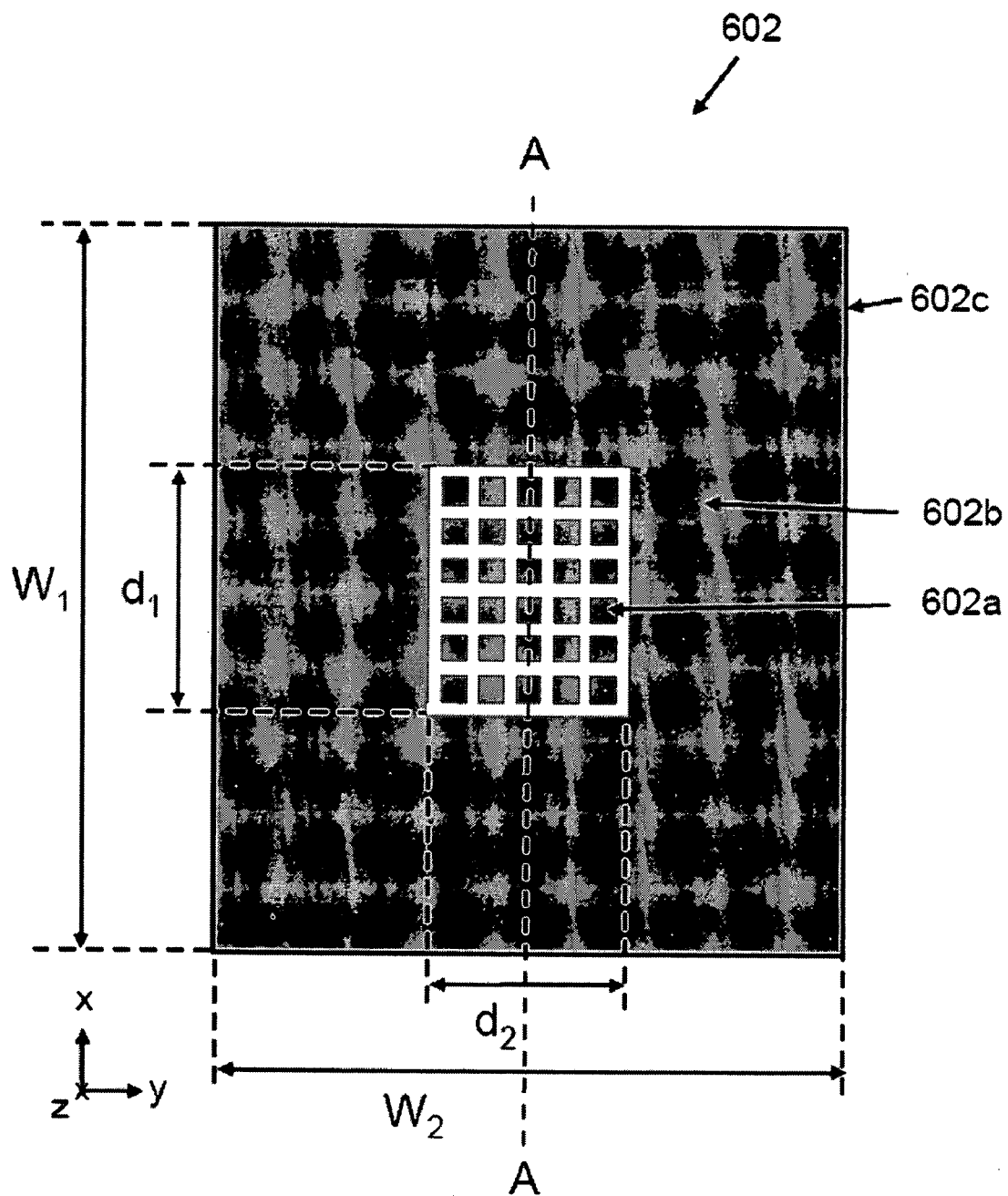
FIG. 4E shows a front plan view of a reflective plate usable in the homogenizer of the PCSs of FIGS. 4A-D.
Figure 4F:
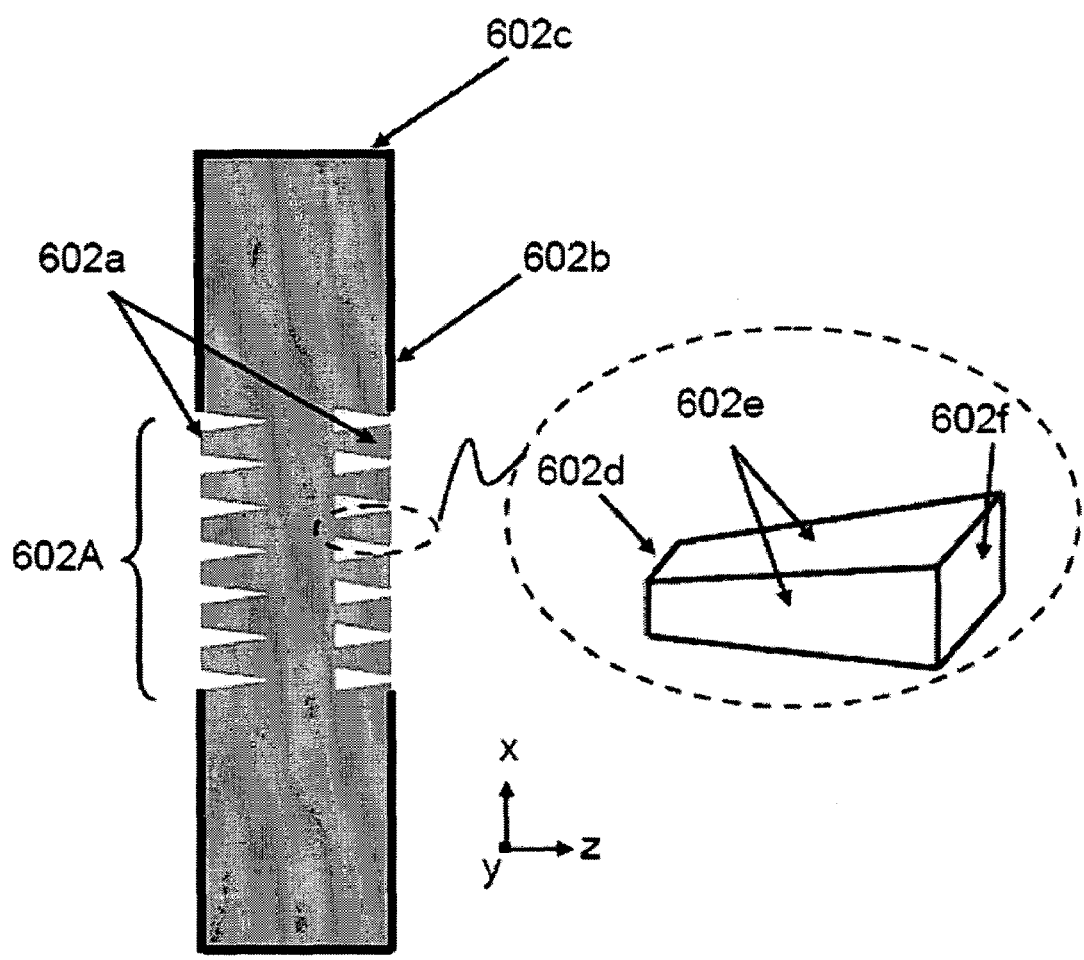
FIG. 4F shows a cross sectional view of the reflective plate shown in FIG. 4E.

FIGS. 4E and 4F show a front plan view and a cross-sectional view, respectively, of reflective plate 602 along line A of FIG. 4E. In FIG. 4E, reflective plate 602 has reflective layers 602b and 602c coated on its surface and edges and has a two dimensional array 602A of micro-elements 602a fabricated on both sides of its optically transmissive aperture 601 which has an area of $d_1 \times d_2$. Aperture 601 can have any suitable shape such as circular, oval, rectangular, square and irregular. Micro-elements 602a can be arranged in a one or two dimensional array 602A and their distribution can be random, uniform, or non-uniform. Each micro-elements 602a is a tapered solid micro-guide with entrance 602d and exit 602f apertures and four sidewalls 602e (only two are shown in FIG. 4F).

Reflective layers 602b and 602c can be dielectric mirrors that do not rotate the polarization state of reflected light. Other types, tapers, sizes and shapes of micro-elements 602a are possible and they are not required to preserve the polarization state of input light. Light guide 603 can be solid light guide made of optically transmissive material such as glass with polished surfaces or hollow light guide with reflective sidewalls and can also be straight or tapered with an exit aperture of cross section aspect ratio as the display panel used in the projection system.

Figure 4G:
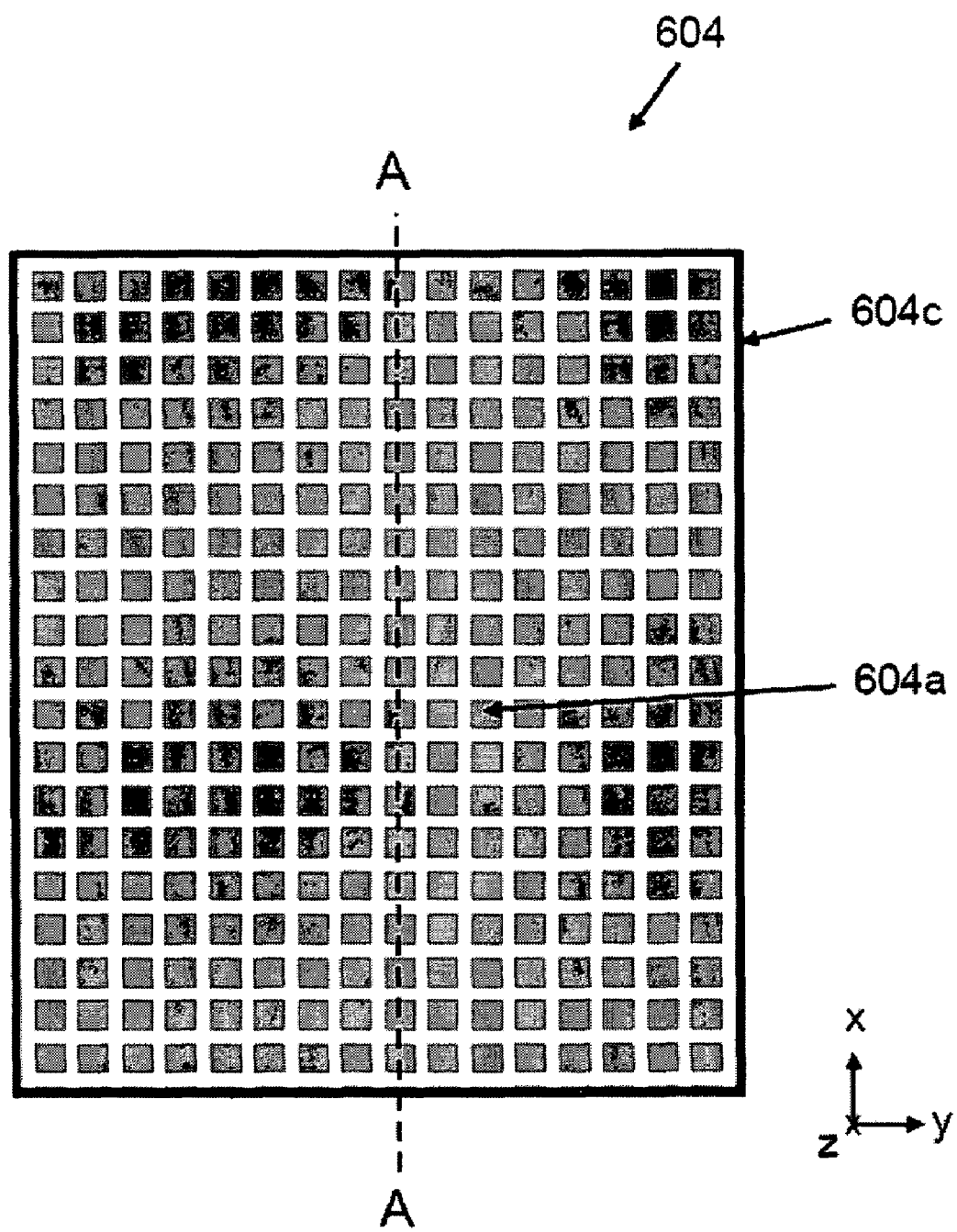
FIG. 4G shows a front plan view of an optical element array used in the homogenizer of the PCSs of FIGS. 4A-D.
Figure 4H:
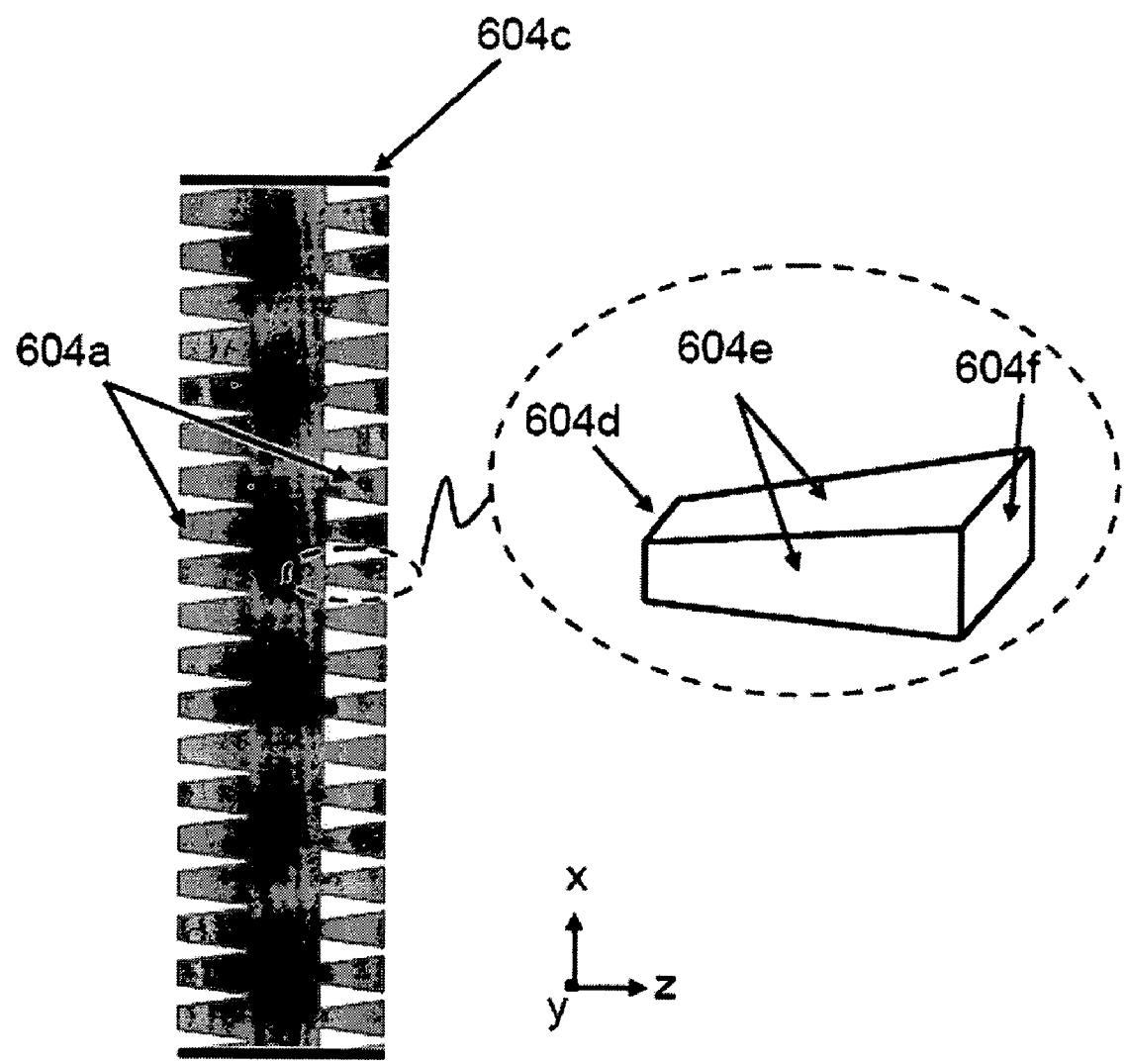
FIG. 4H shows a cross sectional view of the optical element array of FIG. 4G.

FIGS. 4G and 4H show a front plan and a cross-sectional view, respectively, of optical element array 604 along line A of FIG. 4G. Collimating micro-elements 604a are fabricated in a two dimensional array 604 on both sides of an optically transmissive substrate and are aligned in a way that do not rotate the polarization of light. The edges of the substrate are coated with a reflective layer 604c. The cross-section aspect ratio of optical element array 604 is preferably equal to that of the display panel used in the projection system.

Figure 4I:
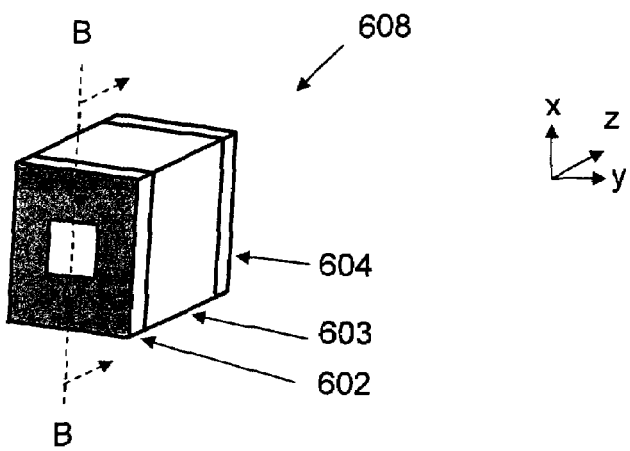
FIG. 4I shows a perspective view of an alternative homogenizer usable in the PCSs of FIGS. 4A-4B, which is implemented with a collimating optical element array.
Figure 4J:
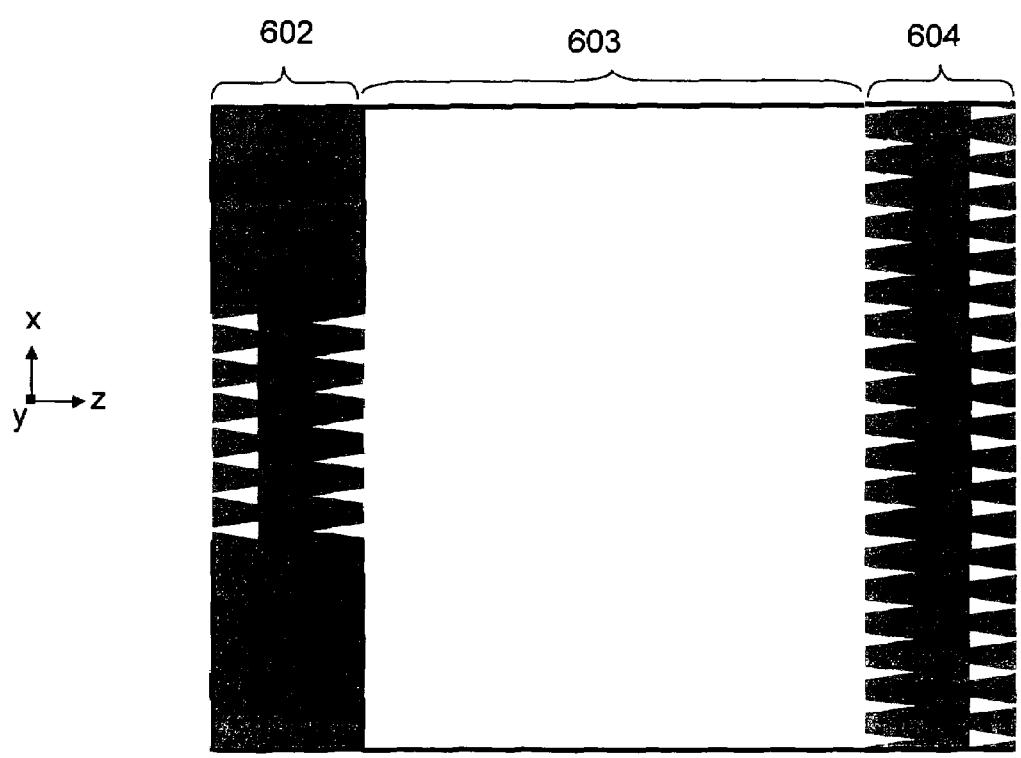
FIGS. 4J-4K show cross sectional views of two versions of the homogenizer of FIG. 4I.
Figure 4K:
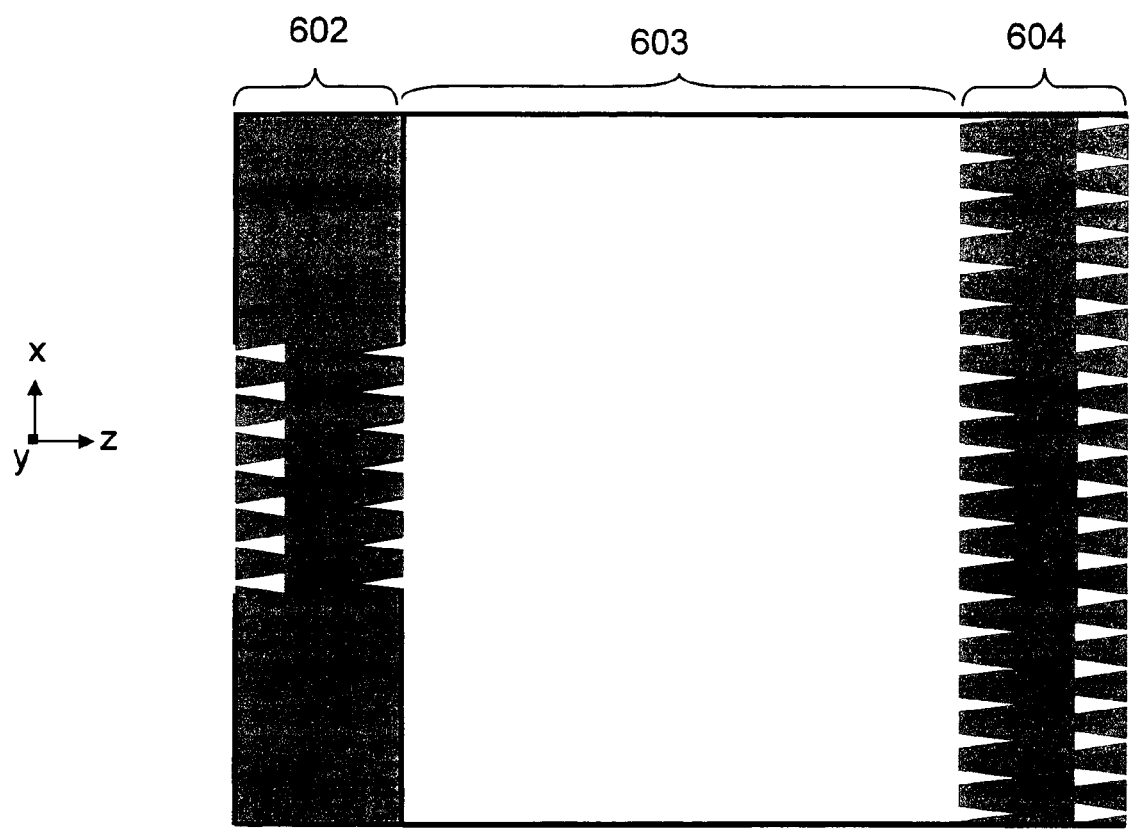
Figure 4L:
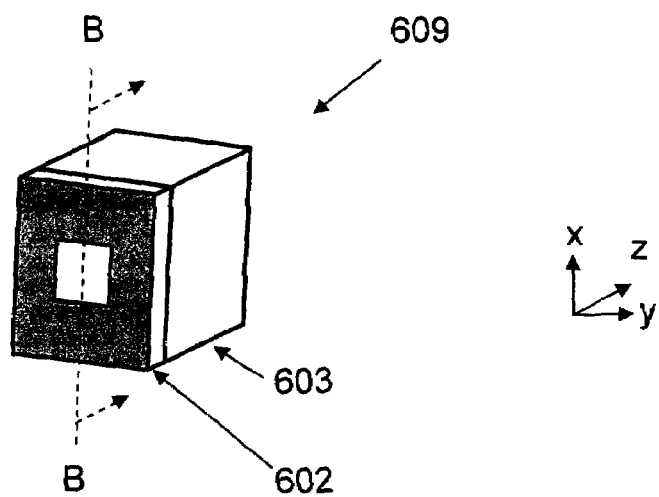
FIG. 4L shows a perspective view of a further alternative homogenizer structure, which is implemented without a collimating optical element array.
Figure 4M:
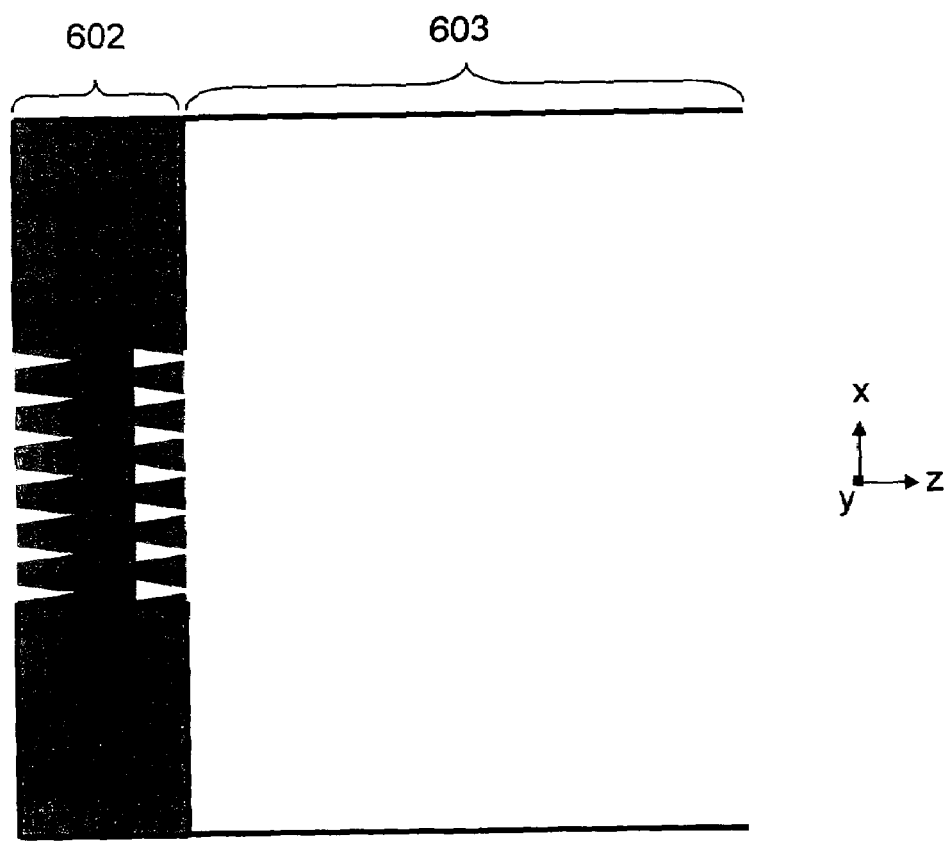
FIG. 4M shows a cross sectional view of the homogenizer of FIG. 4L.

FIGS. 4I-4M show two additional homogenizers 608 and 609. FIGS. 4I and 4L show perspective views of homogenizers 608 and 609, respectively, and FIGS. 4J-4K and 4M show cross-sectional views along plane B of FIGS. 4I and 4L, respectively.

In homogenizer 608, array 602 is flipped so that it diverges rather than collimates the input light, which results in achieving required light uniformity with a short light pipe/tunnel 603. If one uses straight (i.e. no taper) or collimating micro-pipes within array 602 (FIG. 4M), a longer light pipe/tunnel 603 will be required to achieve the required light uniformity assuming that the entrance and exit apertures of light pipe/tunnel 603 remain equal in all cases. As shown in FIG. 4M, homogenizer 609 is implemented without a collimating array 604 at its exit aperture but uses array 602 to collimate input light. The efficiency of homogenizer 608 can be increased by coating the sidewalls of micro-elements 602a of reflective plate 602 by a reflective coating as shown in FIG. 4K. Polarization conversion systems (PCSs) 610, 650, 690 and 710 of FIG. 4 have the same key advantages as these of PCSs of FIG. 2.

Figure 5A:
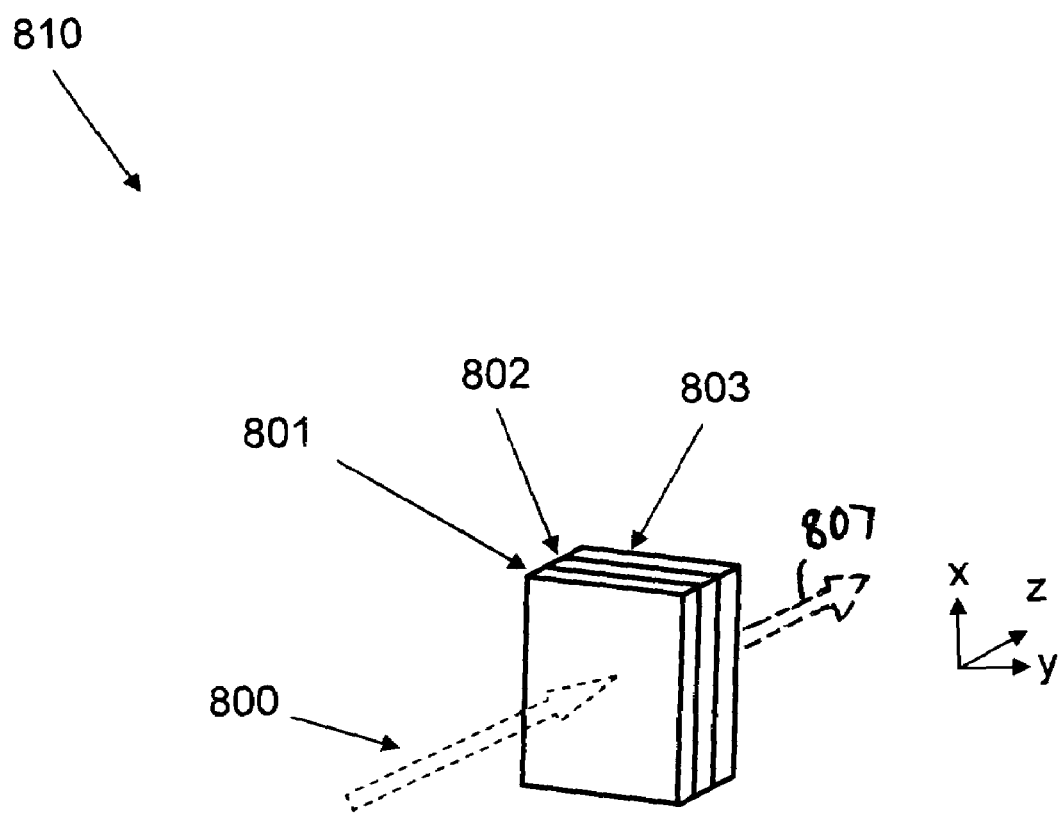
FIGS. 5A-5C show perspective views of three compact polarization conversion systems in accordance with three further exemplary embodiments of the present invention.
Figure 5B:
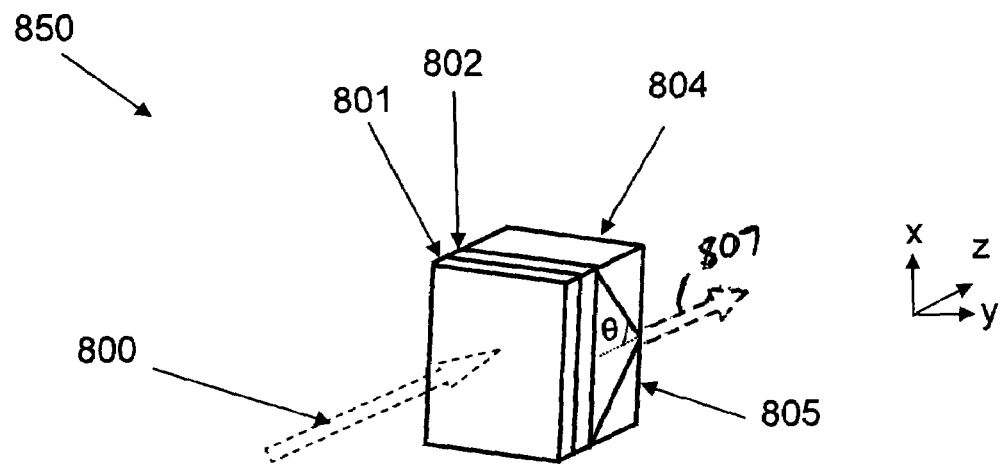
Figure 5C:
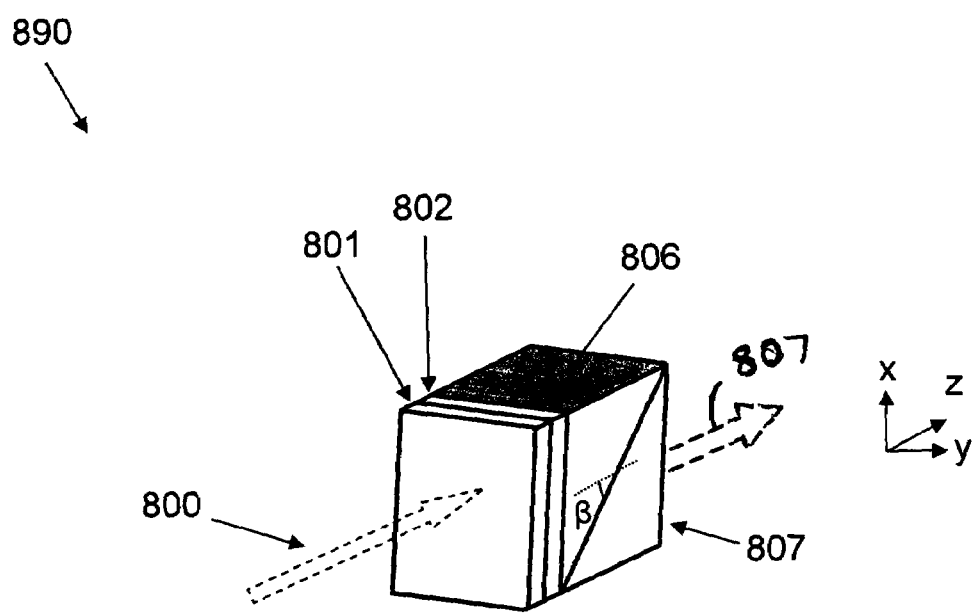
Figure 5D:
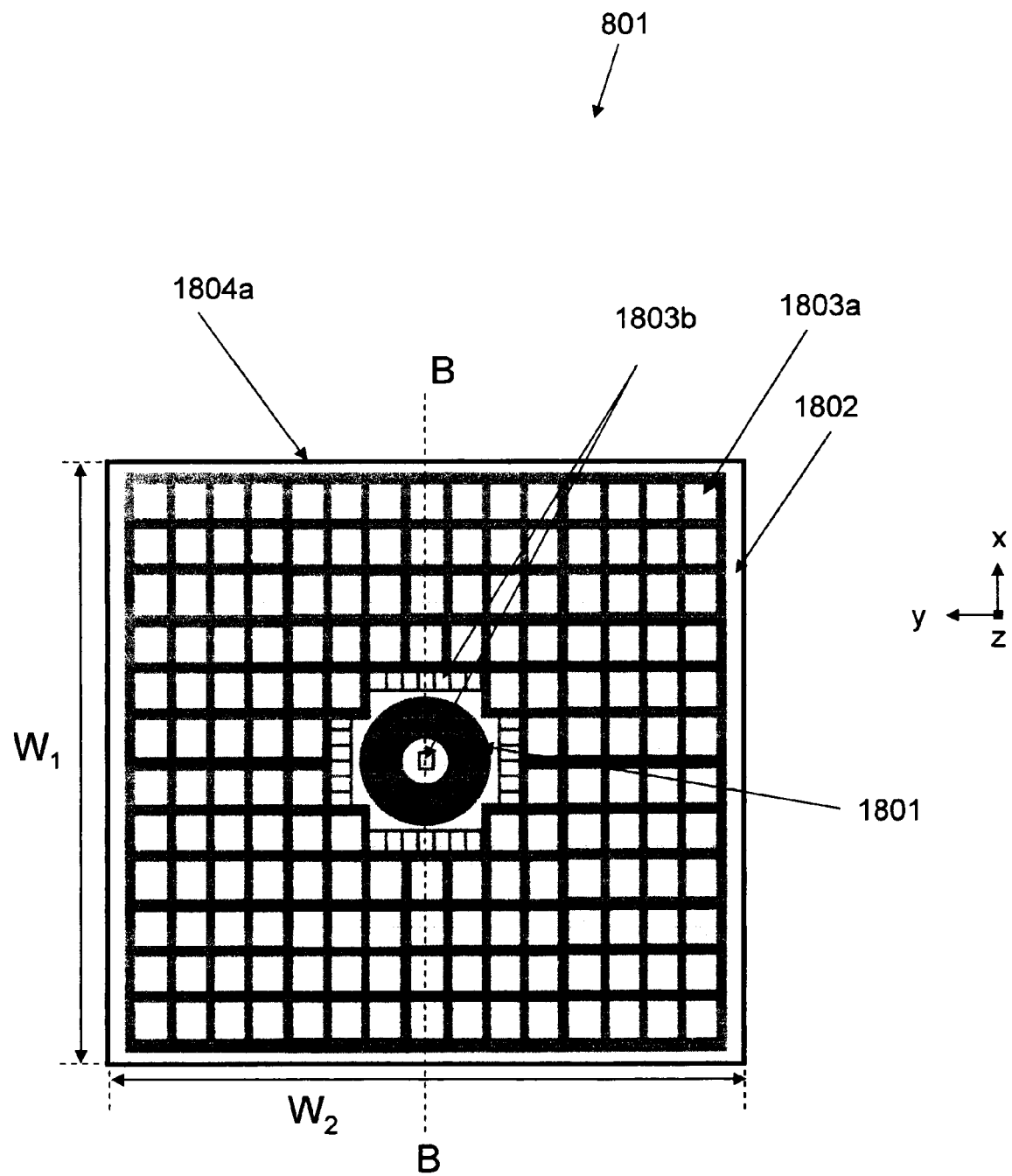
FIG. 5D shows a front plan view of a single-plate homogenizer usable in the PCSs shown in FIGS. 5A-5C.
Figure 5E:
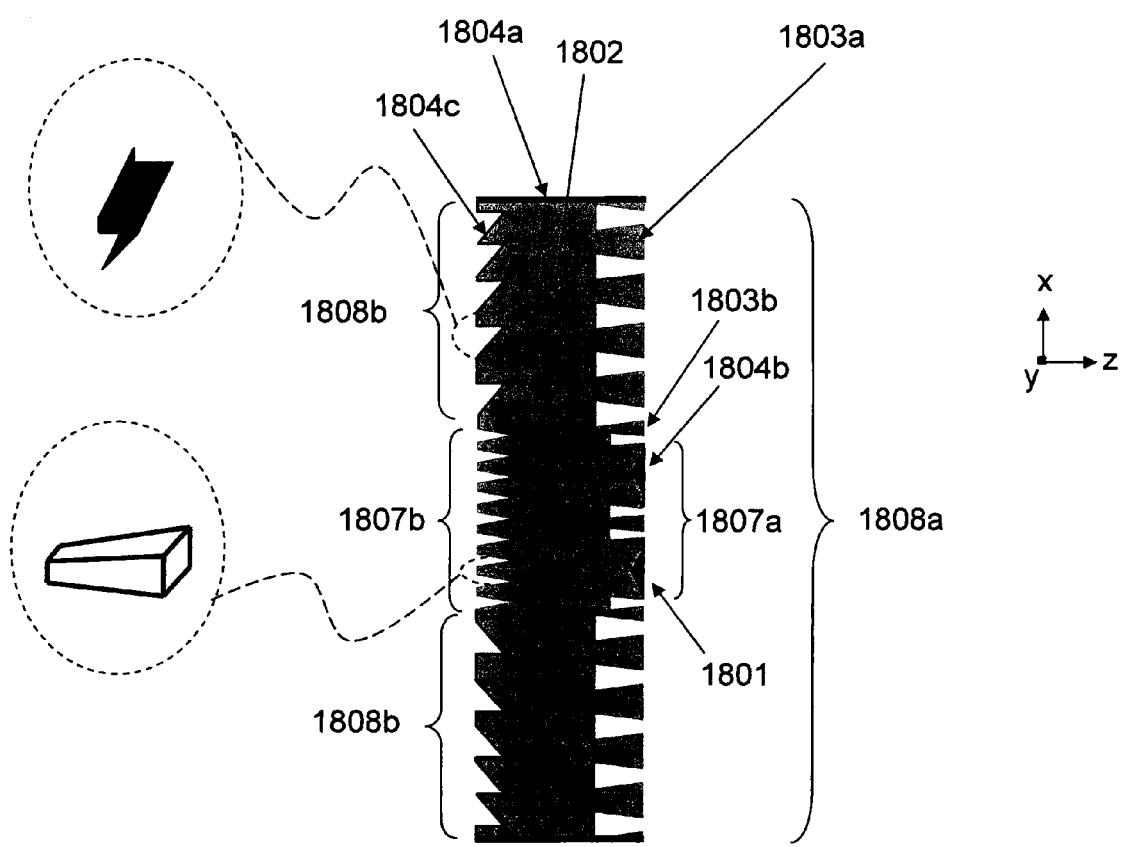
FIG. 5E shows a cross sectional view of the single-plate homogenizer of FIG. 5D.

FIGS. 5A-5C show perspective views, respectively, of three compact polarization conversion systems 810, 850 and 890 utilizing a single-plate homogenizer 801, in accordance with three further embodiments of the present invention. Homogenizer 801 provides the required spatial distribution of light and acts as a unidirectional reflective plate. FIGS. 5D and 5E show a top view and a cross sectional view of homogenizer 801 along line B of FIG. 5D.

As shown in FIG. 5E, circulation array 1807a and extraction array 1808a are fabricated on the back side of substrate 1802. Extraction array 1808a consists of extraction micro-elements 1803a and 1803b which overlap with circulation micro-elements 1804b. On the front side of substrate 1802, there are circulation array 1808b and an optional collimating array 1807b. Collimating array 1807b can be eliminated or replaced by an optical element array of another type.

Circulation array 1808b consists of one dimensional micro-elements, which extend in the y-direction and are coated with a reflective layer 1804c. The function of array 1808b is to collimate light impinging on it so that it exits the surface of array 801 perpendicularly (i.e., substantially parallel to the Z-axis). Extraction micro-elements within array 1808b are preferably made of micro-elements that collimate light in two directions rather than one. Such micro-elements may be micro-prisms or micro-lenses that are arranged in a two dimensional array. Micro-elements within extraction arrays 1808a and 1808b are distributed over the surface of the substrate 1802 so that light is extracted uniformly from the body of the substrate 1802. It is possible to have a homogenizer 801 with a single extraction array either 1808a or 1808b. For simplicity of illustration, the circulation array 1807a is shown to have one circulating micro-element 1801 as shown in FIG. 5D. The number, size and shape of circulating micro-element 1801 are some of the design parameters of circulation array 1807a.

A reflective layer 1804a is bonded or deposited on the four edges of substrate 1802. Reflective and refractive micro-elements 1803a, 1803b, 1801 and 1804c of homogenizer 801 are aligned so that they do not rotate the light polarization. However, micro-elements of array 1807b may not have to follow this restriction. The operation of collimating 1807b, circulation 1807a and extraction 1808a and 1808b optical element arrays is substantially the same as the operation of the already discussed collimating, circulation and extraction arrays. Thus, homogenizer 801 and polarization conversion systems 810, 850 and 890 operate in a similar manner to those 410, 490 and 510 of FIGS. 3A-3C.

Polarization conversion systems 810, 850 and 890 have same key advantages as these PCSs of FIG. 2. In addition, they provide higher compactness in comparison with PCSs of FIG. 2 but at a lower efficiency due to the small size of their input aperture 1807b.

Figure 6A:
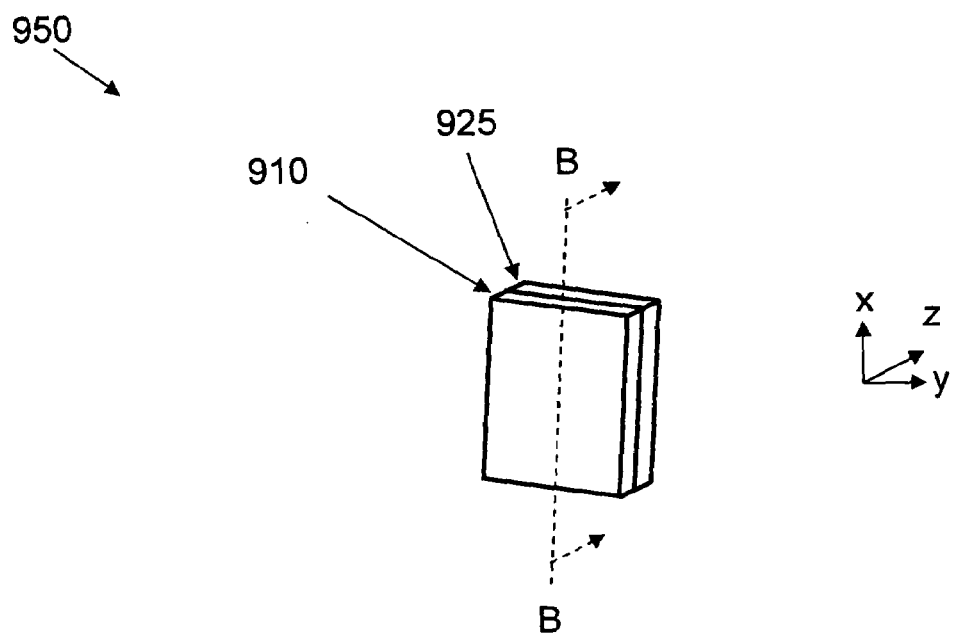
FIGS. 6A-6B show perspective views of two additional homogenizers usable in the PCSs disclosed herein.
Figure 6B:
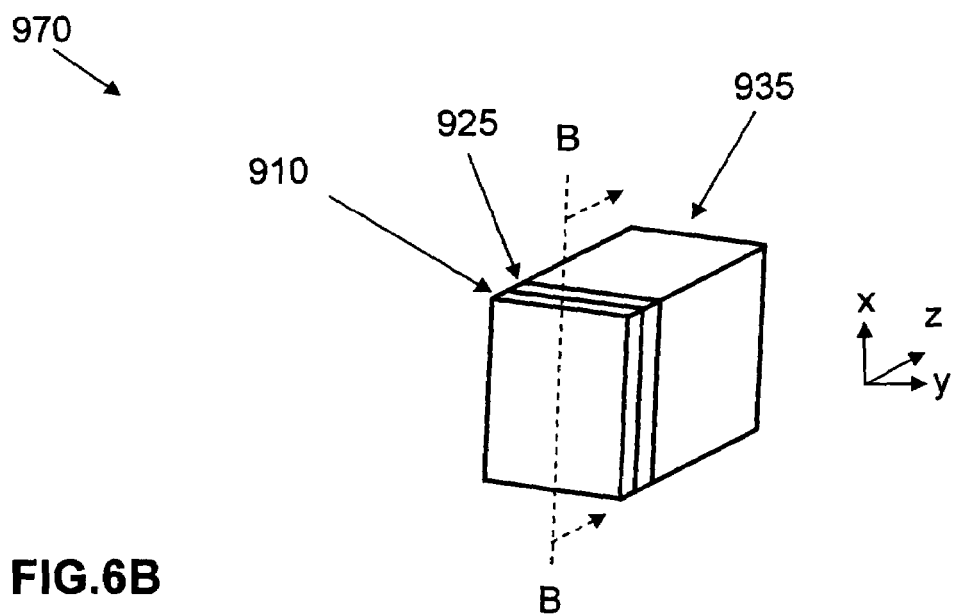

FIGS. 6A-6B show perspective views of two homogenizers 950 and 970, which can be used in the implementation of polarization conversion systems (PCSs) 210, 230, 250 and 270 of FIGS. 2A-2D. Homogenizer 950 uses two optical element arrays 910 and 925 in its structure, whereas, homogenizer 970 uses in addition to that a light pipe/tunnel 935.

Figure 6C:
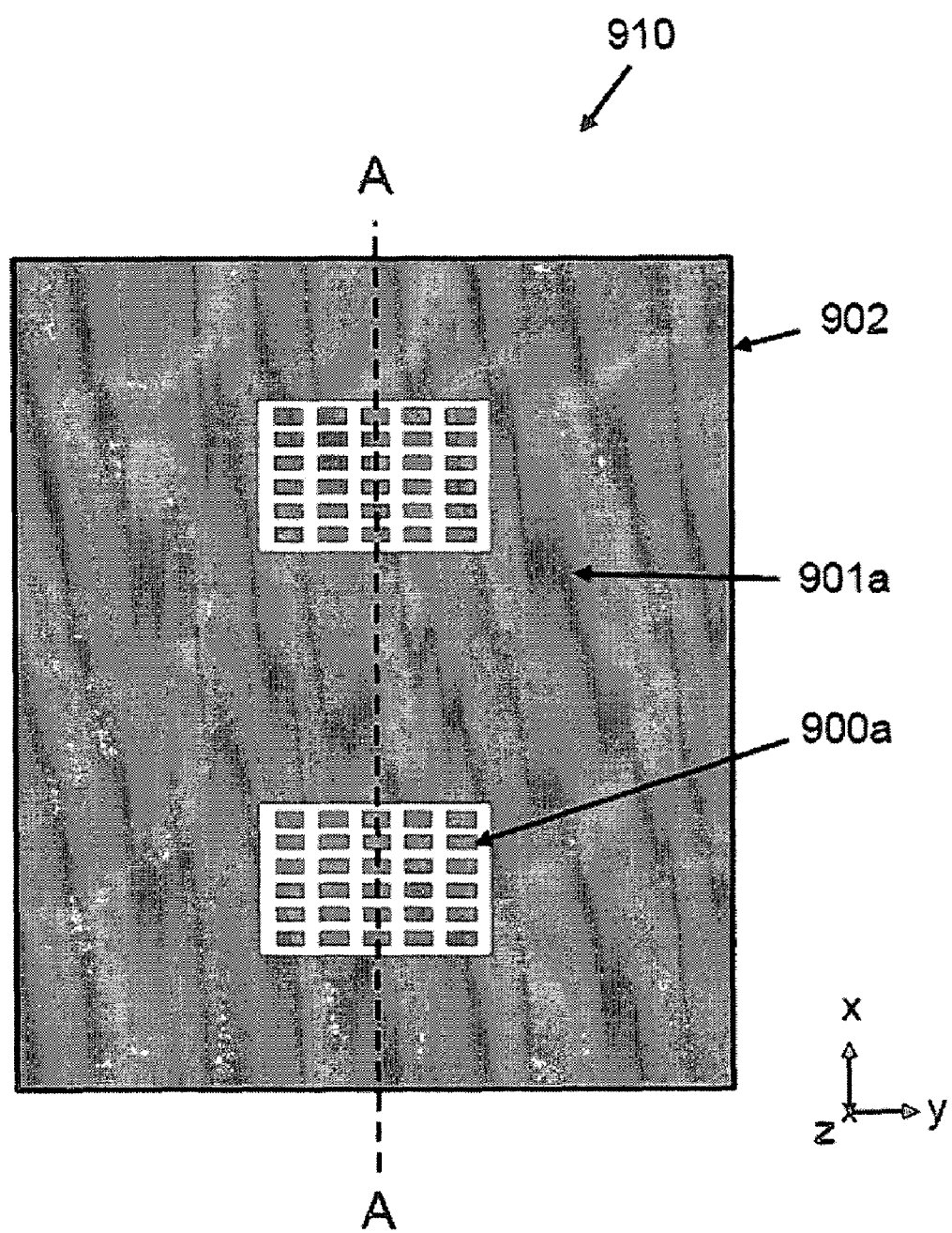
FIGS. 6C-6D show front and back plan views, respectively, of an optical element array included in the homogenizers of FIGS. 6A-6B.
Figure 6D:
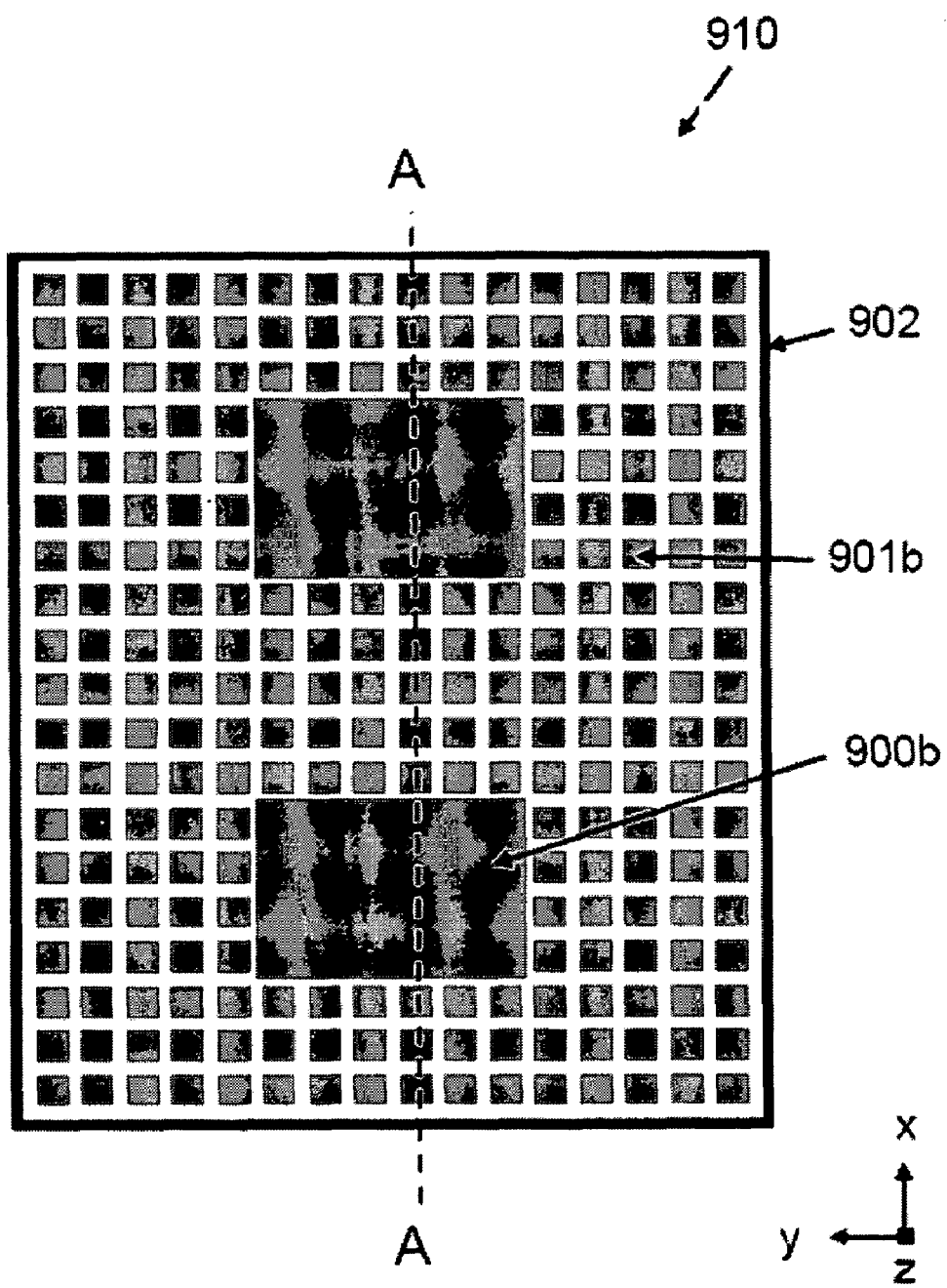
Figure 6E:
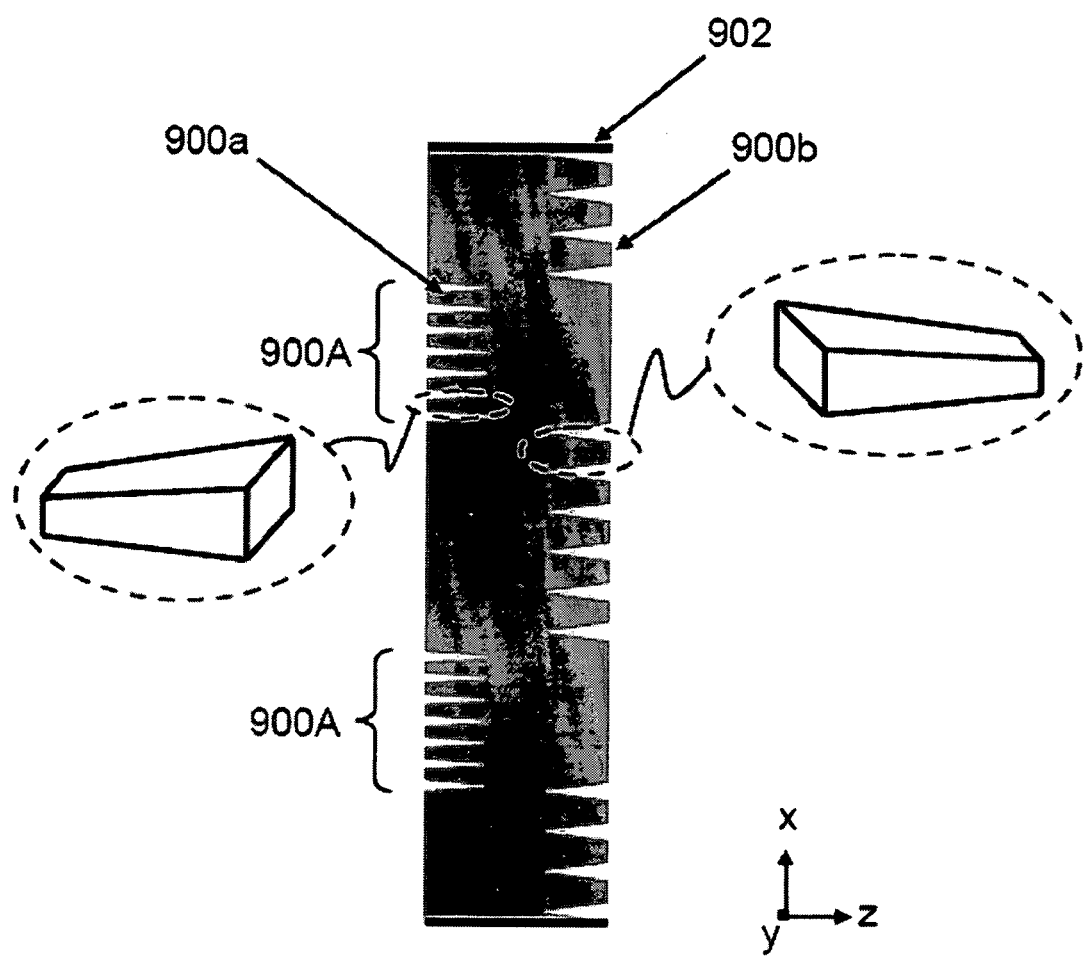
FIG. 6E shows a cross sectional view of the waveguide shown in FIGS. 6C-6D.

FIGS. 6C and 6D show front and back side views of optical element array 910 and FIG. 6E shows a cross-sectional view of FIGS. 6B-6C along line A. Two collimating optical element arrays 900A are shown on the front surface of optical element array 910, which correspond to the location of the divided hot spot as delivered by polarization beam splitter cubes of FIG. 2A-2D to the homogenizers 950 and 970. On the back side of array 910, there are extraction micro-guides 900b arranged in an array in the xy-plane.

Figure 6F:
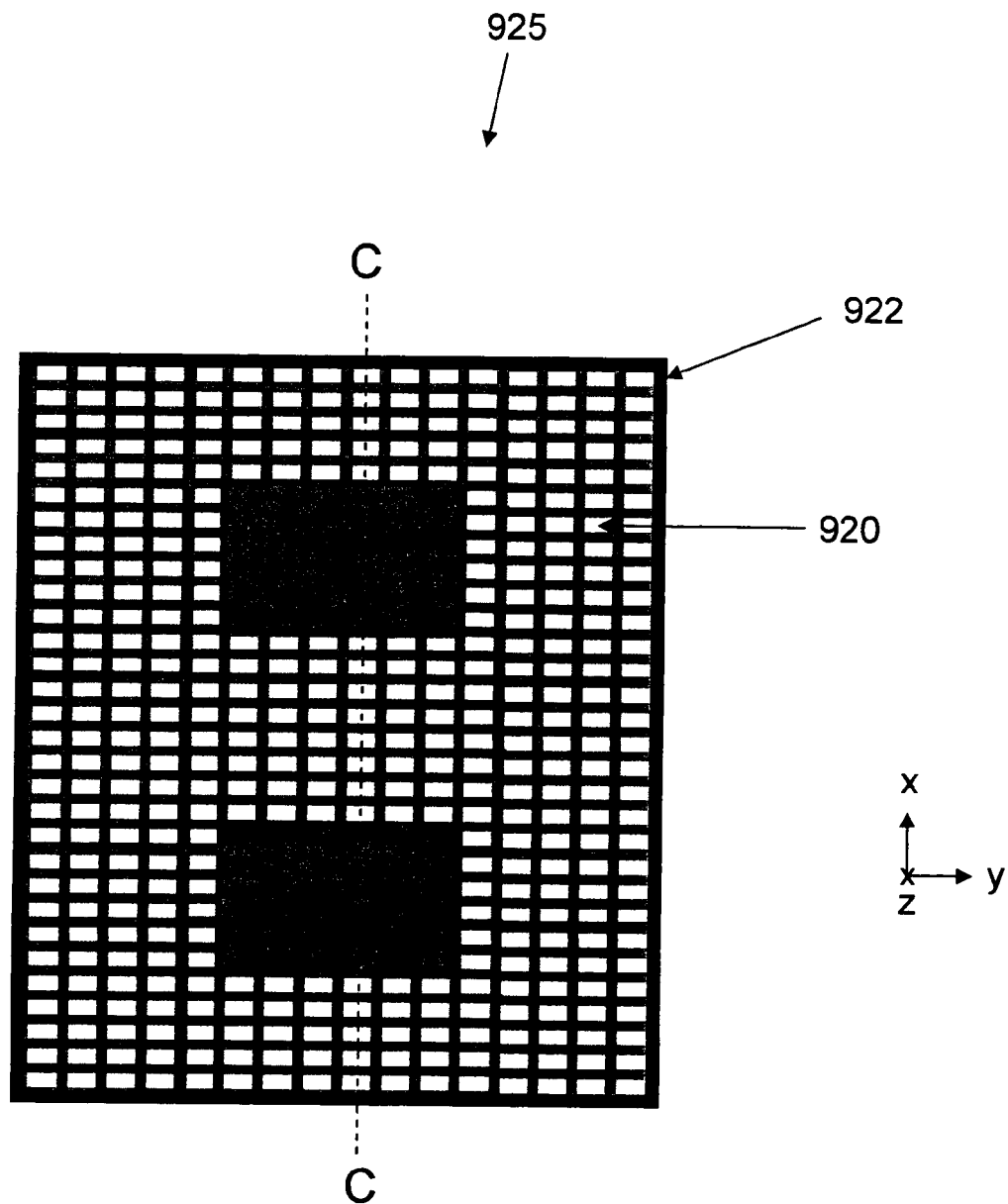
FIG. 6F shows a front plan view of a collimating optical element array included in the homogenizers of FIGS. 6A-6B.
Figure 6G:
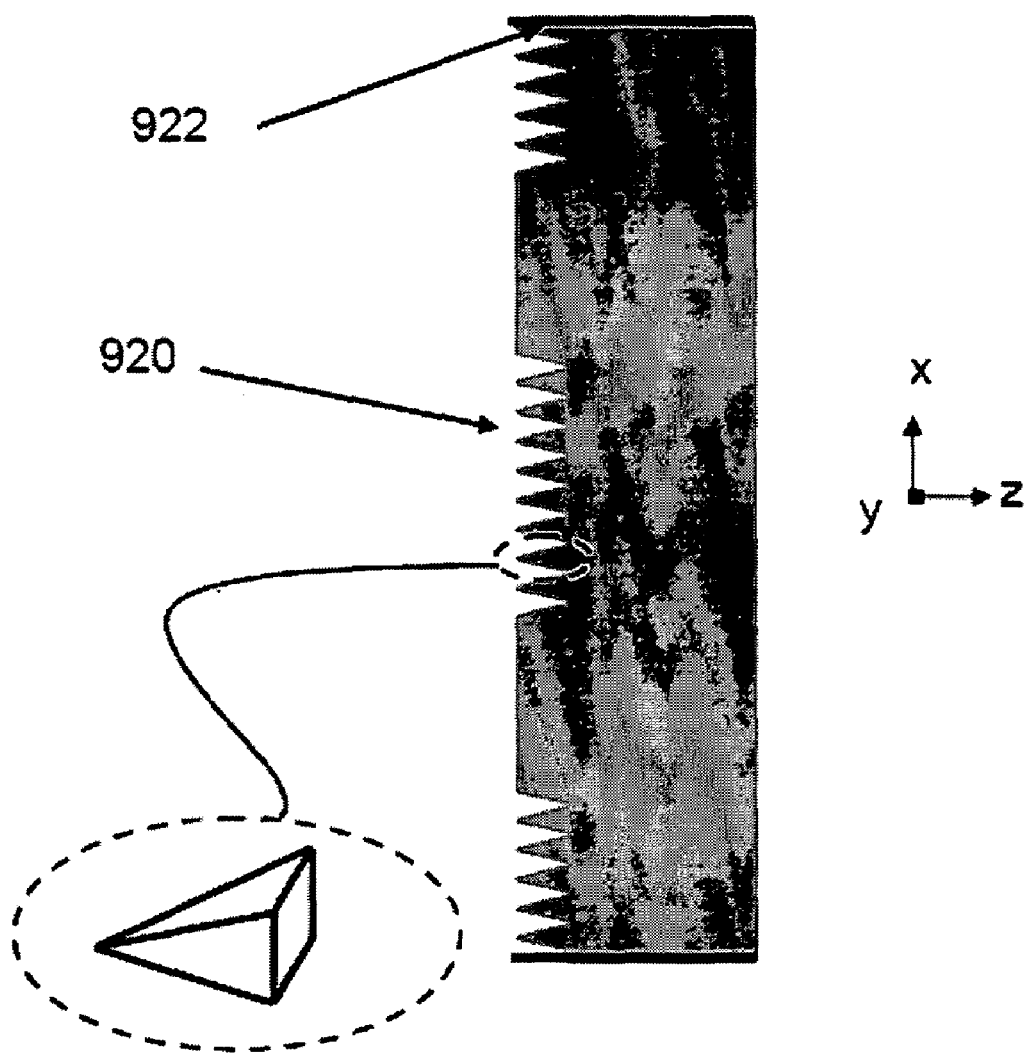
FIG. 6G shows a cross sectional view of the collimating optical element array of FIG. 6F.
Figure 6H:
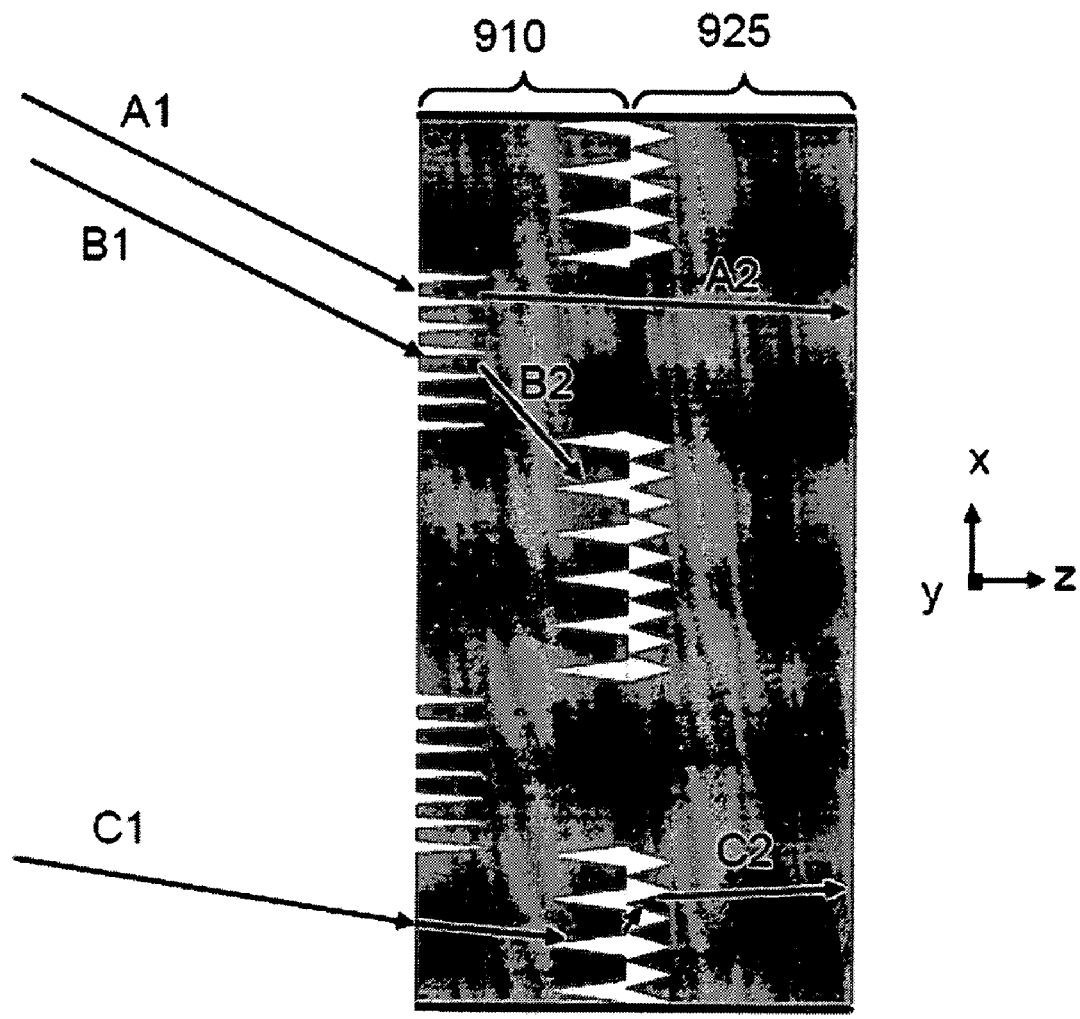
FIG. 6H-6I shows cross views, respectively, of the homogenizers shown in FIG. 6A-6B.
Figure 6I:
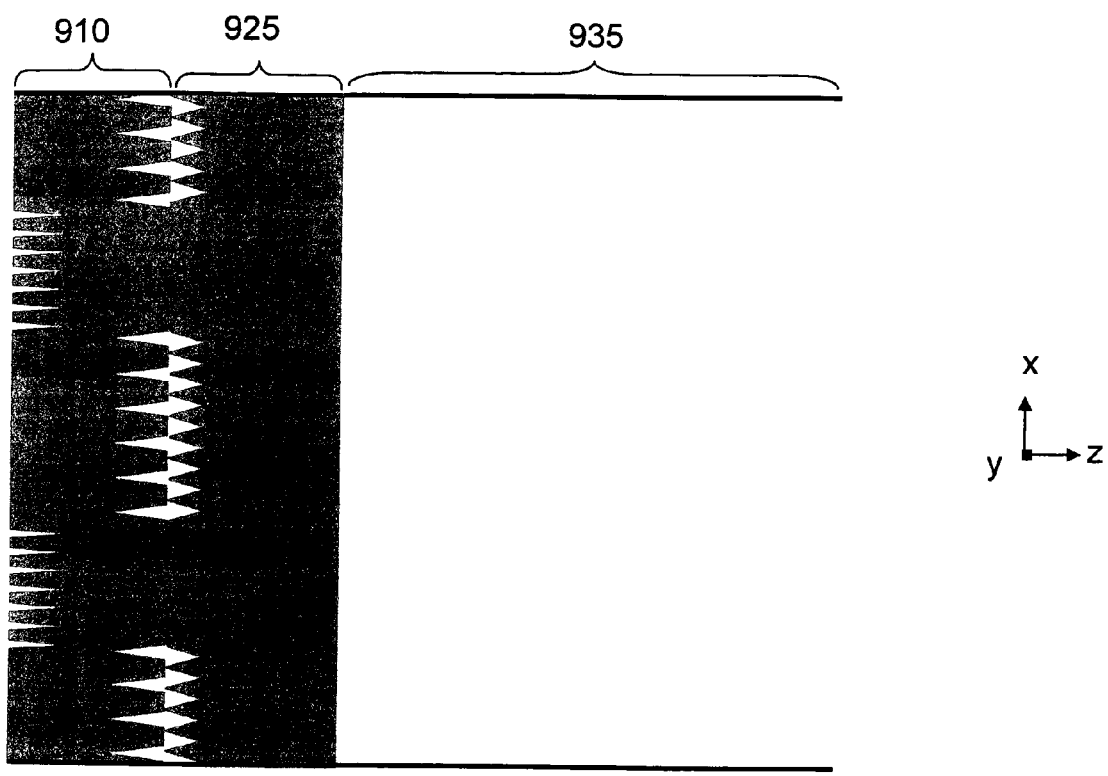

Distribution of these extraction micro-guides 900b can be uniform (FIG. 6D), non-uniform or random. Exploded three dimensional views of collimating micro-guides 900a and extraction micro-guides 900b are shown in FIG. 6E. FIGS. 6F and 6G show a perspective view and cross sectional view of collimating optical element array 925 along line C of FIG. 6F. As shown in FIG. 6F-6G, micro-prisms 920 are distributed over the surface of array 925 in areas that do not correspond to the divided hot spot (i.e., collimating array 900A). A three dimensional view of micro-prisms 920 is shown in FIG. 6G. Cross sectional views of homogenizers 950 and 970 are shown in FIGS. 6H-6I along plane B of FIGS. 6A-6B.

The operation of homogenizers 950 and 970 is based on collimating part of the light in the hot spot, which is made of substantially high angles, that passes through the entrance apertures of the collimating micro-guides 900a of array 900A. The hot-spot light that passes through the sidewalls of micro-guides 900a is diverged (i.e., cone angle is increased) and gets spatially separated from the collimated light as it reaches the extraction micro-guides 900b. For simplicity of illustration, rays A1 and A2 represent the hot-spot light that goes through the entrance apertures of the collimating micro-guides 900a and rays B1 and B2 represent the hot-spot light that goes through their sidewalls as shown in FIG. 6H. Light extracted from the body of array 910 is collimated by micro-prism array 925 and light collimated by array 900A travels through plates 910 and 925 without encountering any micro-elements. Outside the hot-spot area, light intensity is lower and light is made of substantially low angles. This light passes through the extraction micro-guides 900b and exits with a larger cone angle, thus, becoming a candidate for collimation by the micro-prism array 925. Light that enters micro-prism array 925 with low angles (i.e., already collimated) exits micro-prisms 920 with a high angle and gets recycled back toward array 910 via TIR and reflections off of coated plate edges 902 and 922. Such case is represented by rays C1 and C2 as shown in FIG. 6H. Light exiting plate 925 enters light pipe/tunnel 935 for further homogenization then to next stage (FIG. 6I) or is directly delivered to the next stage (FIG. 6H).

In general, the polarization conversion systems disclosed herein preferably have the same cross section aspect ratio as the display panel used in the display system. Since a wave plate is used to rotate polarization by 90 degrees, micro-elements and optical element arrays used to implement polarization conversion systems can be aligned with other components in the polarization conversion system so that polarization is preserved when light is recycled through these micro-elements and optical element arrays. This kind of alignment enhances the efficiency of the polarization conversion system. In polarization conversion system where no wave plate is used to convert the polarization of recycled light, micro-elements and optical element arrays can be designed and aligned to achieve the function of the wave plate (i.e., rotate polarization randomly or non-randomly).

Micro-elements used within optical element arrays disclosed herein may include micro-guides, micro-tunnels, micro-lenses, micro-prisms and combinations of different types in a single optical element array. Such micro-elements are typically separated from adjacent micro-elements by either air or material with lower index of refraction than that of the micro-elements themselves. Design parameters of each micro-element within an array include shape and size of entrance and exit apertures, depth, sidewalls shape and taper, and orientation. Micro-elements within an array can have uniform, non-uniform, random or non-random distributions and range from thousands to millions with each micro-element being distinct in its design parameters.

The size of the entrance/exit aperture of each circulation micro-element is preferably $\geq 5$ μm in case of visible light in order to avoid light diffraction phenomenon. However, it is possible to design micro-elements with sizes of entrance/exit aperture being <5 μm. In such case, the design should consider the diffraction phenomenon and behavior of light at such scales to provide homogeneous light distributions in terms of intensity, viewing angle and color over a certain area. Micro-elements can be arranged as a one-dimensional array, two-dimensional array, or circular array and can be aligned or oriented individually.

The specific shapes, sizes and arrangements of the optical element arrays described herein are only a small subset of the possible optical element arrays that can be used within the scope and spirit of the invention. Some of the other array types that are usable with the PCSs disclosed herein are described in the U.S. Patent Applications identified in the immediately following paragraph.

Techniques for manufacturing the optical element arrays and PCSs disclosed herein are described in U.S. patent application Ser. No. 10/458,390, titled "Light Guide Array, Fabrication Methods and Optical System Employing Same" and U.S. patent application Ser. No. 11/066,616, titled "Compact Projection System Including A Light Guide Array", filed on Feb. 25, 2005, both of which are incorporated herein by reference.

While various embodiments of the invention have been described, it will be apparent to those of ordinary skill in the art that more embodiments and implementations, other than those specifically described above, are possible that are within the scope of this invention. Further, the foregoing summary, detailed description and drawings are considered as illustrative only of the principles of the invention and are not intended to limit the scope of the invention. Since other modifications and changes may be or become apparent to those skilled in the art, the invention is thus not limited the exact embodiments shown and described above, and accordingly, all suitable modifications and equivalents are deemed to fall within the scope of the invention, as it is defined by the claims below.

What is claimed is:

1. A polarization conversion system (PCS) for outputting polarized light having a predetermined cone angle and a predetermined intensity in response to receiving unpolarized light having plural polarization states, comprising:
    polarization means for converting the unpolarized light to polarized light; and
    a homogenizer, in optical communication with the polarization means, including an optically-transmissive body having an entrance surface for receiving input light and an exit surface for outputting light having substantially the predetermined cone angle and the predetermined intensity, the homogenizer being configured to pass a predetermined first portion of the input light through the exit surface and to recycle a predetermined second portion of the input light within the optically-transmissive body between the entrance and exit surfaces, whereby the polarization means and the homogenizer cooperatively convert the unpolarized light into the polarized light having the predetermined cone angle and the predetermined intensity;
    wherein the homogenizer's optically-transmissive body comprises:
    a first array of optical elements formed on a surface of a first optically-transmissive, planar substrate for receiving the input light; and
    a second array of optical elements formed on a surface of a second optically-transmissive planar substrate receiving light output from the first array of optical elements, the second array of optical elements being configured to pass the predetermined first portion of the input light and to return the predetermined second portion of the input light back into the body of the homogenizer.

2. The polarization conversion system of claim 1, wherein at least some of the optical elements of the first array are configured to output light having a greater cone angle than the cone angle of input light incident on the first array.

3. The polarization conversion system of claim 1, wherein at least some of the optical elements of the first array are tapered light pipes extending from the surface of the first optically-transmissive, planar substrate.

4. The polarization conversion system of claim 3, wherein each of the light pipes includes an entrance aperture on the first optically-transmissive, planar substrate, an exit aperture smaller than the entrance aperture, a plurality of sidewalls connecting the entrance and exit apertures.

5. The polarization conversion system of claim 4, further comprising a reflective layer on the sidewalls of the light pipes.

6. The polarization conversion system of claim 1, wherein the homogenizer's body further comprises:
    a third array of optical elements formed on a surface of a third optically-transmissive planar substrate receiving light output from the second array of optical elements.

7. The polarization conversion system of claim 6, wherein the third array of optical elements is configured to output light having an angle $\beta_{out}$ relative to the normal of the third optically-transmissive planar substrate which is less that the incident angle $\beta_{in}$ of the light received from the second array of optical elements.

8. The polarization conversion system of claim 6, wherein the third array of optical elements include a plurality of prisms extending from an entrance surface of the third optically-transmissive planar substrate.

9. The polarization conversion system of claim 6, wherein the homogenizer's body further comprises:
    a reflective layer, formed on an entrance surface of the third optically-transmissive planar substrate, having a plurality of optically-transmissive apertures formed therein.

10. The polarization conversion system of claim 6, wherein the homogenizer further comprises a reflective layer on perimeter edges of the first, second and third optically-transmissive, planar substrates.

11. The polarization conversion system of claim 1, wherein the optical elements are selected from the group consisting of micro-guides, micro-tunnels, micro-lenses, micro-prisms, and any combination of the foregoing optical elements.

12. The polarization conversion system of claim 1, wherein the homogenizer's optically-transmissive body further comprises a reflective layer substantially parallel to the first and second optically-transmissive planar substrates for reflecting a portion of the light admitted into the homogenizer back toward the entrance surface of the homogenizer.

13. The polarization conversion system of claim 12, wherein the reflective layer is formed on an exit surface of the second optically-transmissive planar substrate and includes a plurality of optically-transmissive apertures formed therein.

14. A polarization conversion system (PCS) for outputting polarized light having a predetermined cone angle and a predetermined intensity in response to receiving unpolarized light having plural polarization states, comprising:
 a polarizer for converting the unpolarized light to polarized light; and
 a homogenizer, in optical communication with the polarizer, for outputting light having substantially the predetermined cone angle and the predetermined intensity, the homogenizer comprising:
 a plate having a reflective surface with an optically-transmissive aperture formed therein for passing input light;
 a light guide having an entrance face receiving the input light from the optically-transmissive aperture of the plate and an exit face for emitting light; and
 a substantially planar optical element array at the exit face of the light guide, the substantially planar optical element array including a plurality of optical elements formed on at least one surface of an optically-transmissive planar substrate, the substantially planar optical element array being configured to pass a first portion of the light impinging thereon and to return a second portion of the light back into the light guide, whereby the polarizer and the homogenizer cooperatively convert the unpolarized light into the polarized light having the predetermined cone angle and the predetermined intensity.

15. The polarization conversion system of claim 14, wherein the homogenizer further comprises a plurality of optical elements formed on at least one surface of the optically-transmissive aperture of the plate.

16. The polarization conversion system of claim 14, wherein the homogenizer further comprises a plurality of optical elements formed on an entrance surface and an exit surface of the optically-transmissive aperture of the plate.

17. The polarization conversion system of claim 14, wherein the substantially planar optical element array includes a plurality of optical elements formed on both an entrance surface and an exit surface of the optically-transmissive planar substrate.

18. The polarization conversion system of claim 14, wherein the substantially planar optical element array includes a plurality of tapered light pipes extending from a surface of the optically-transmissive planar substrate where each light pipe has a first aperture away from the optically-transmissive planar substrate and a second aperture on the optically-transmissive planar substrate.

19. The polarization conversion system of claim 18, wherein the first aperture is larger than the second aperture.

* * * * *